INVENTOR.
Alfred A. Barnes
& Harvey H. Klein
BY Bodell & Thompson
ATTORNEYS

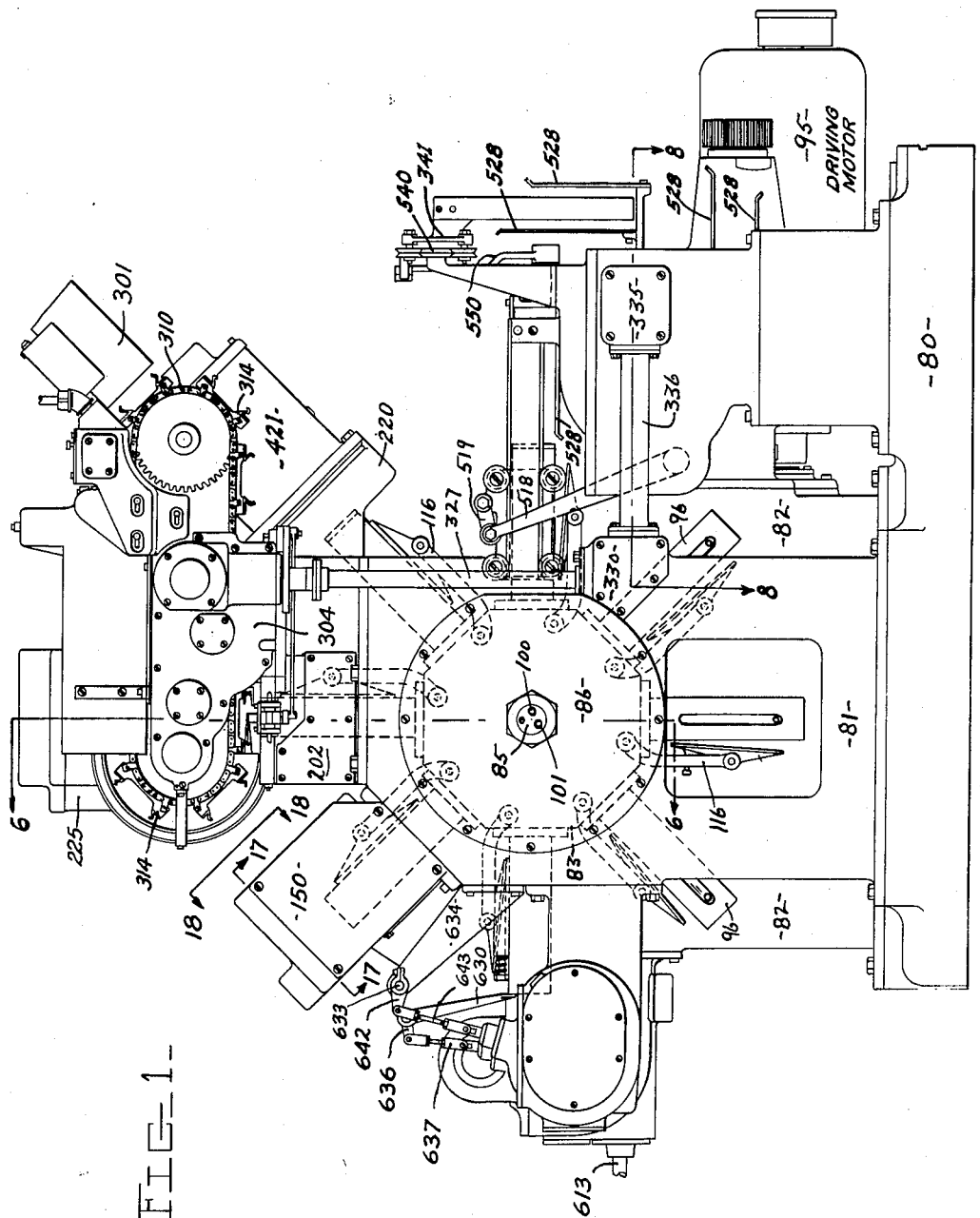

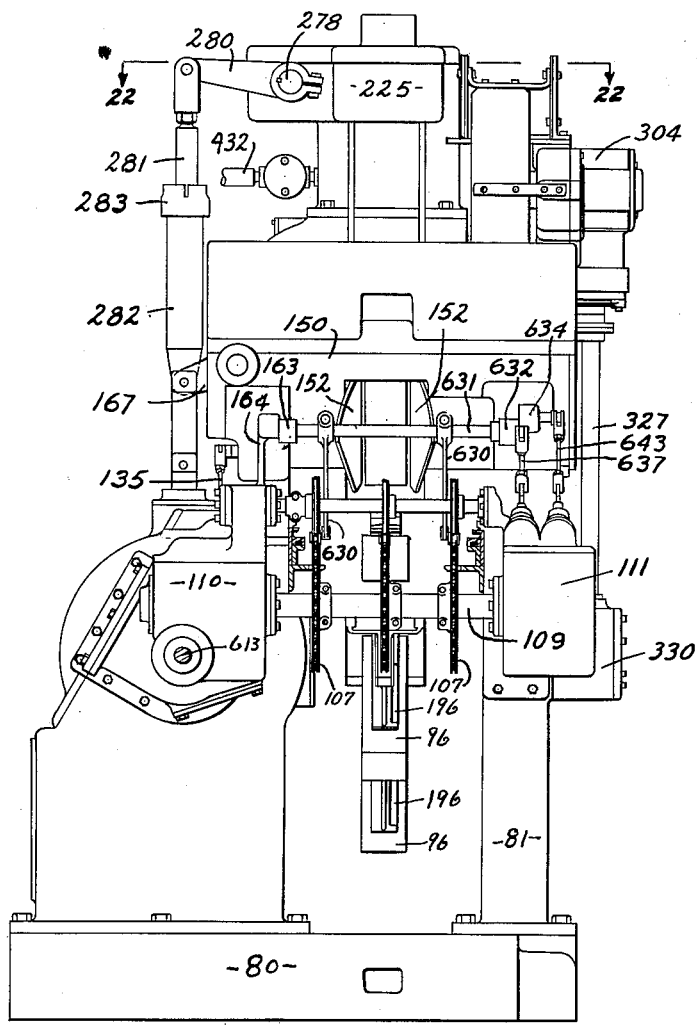

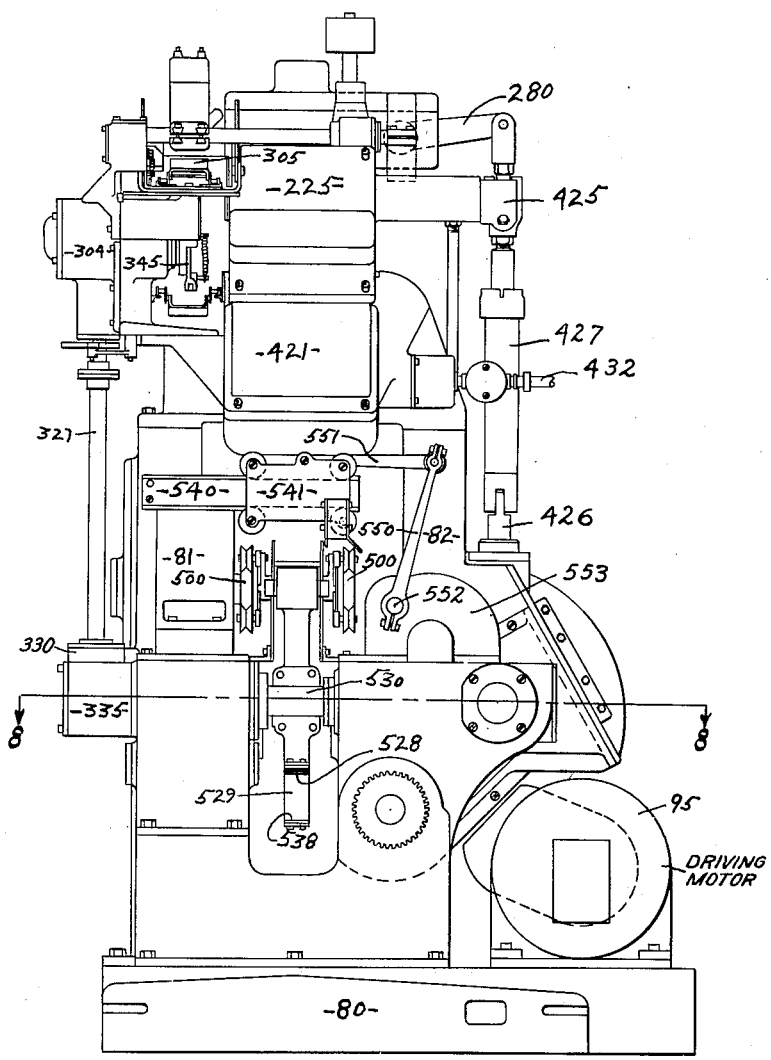

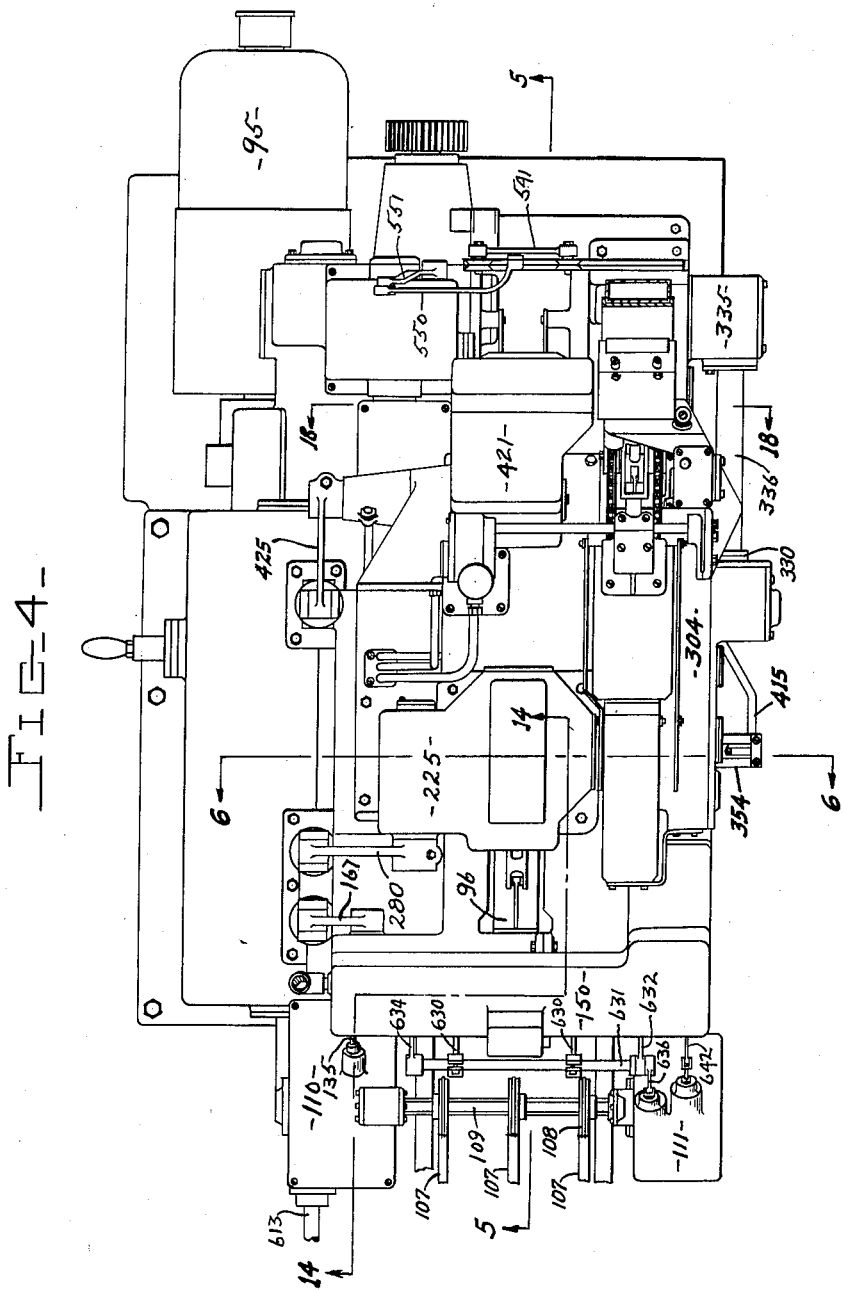

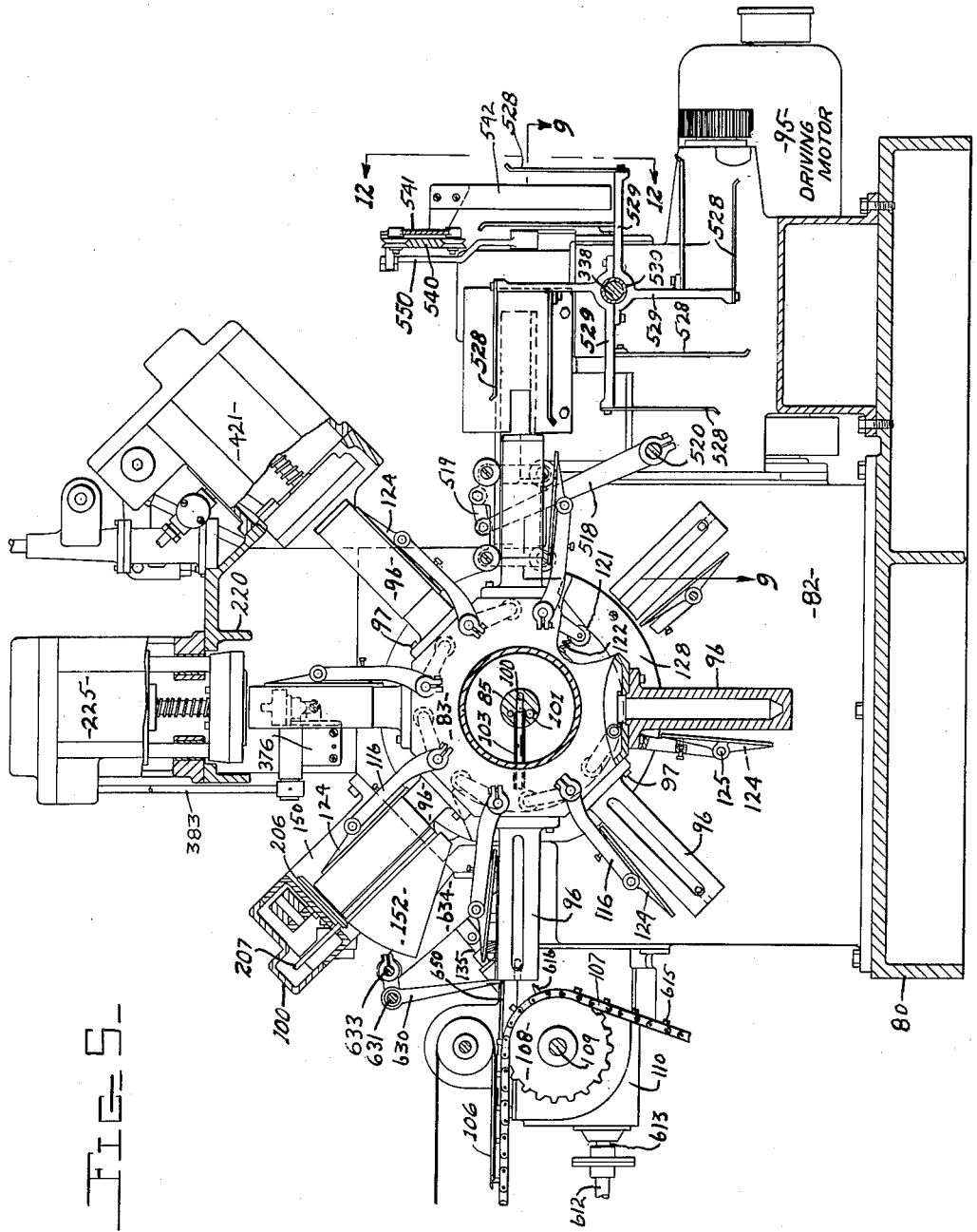

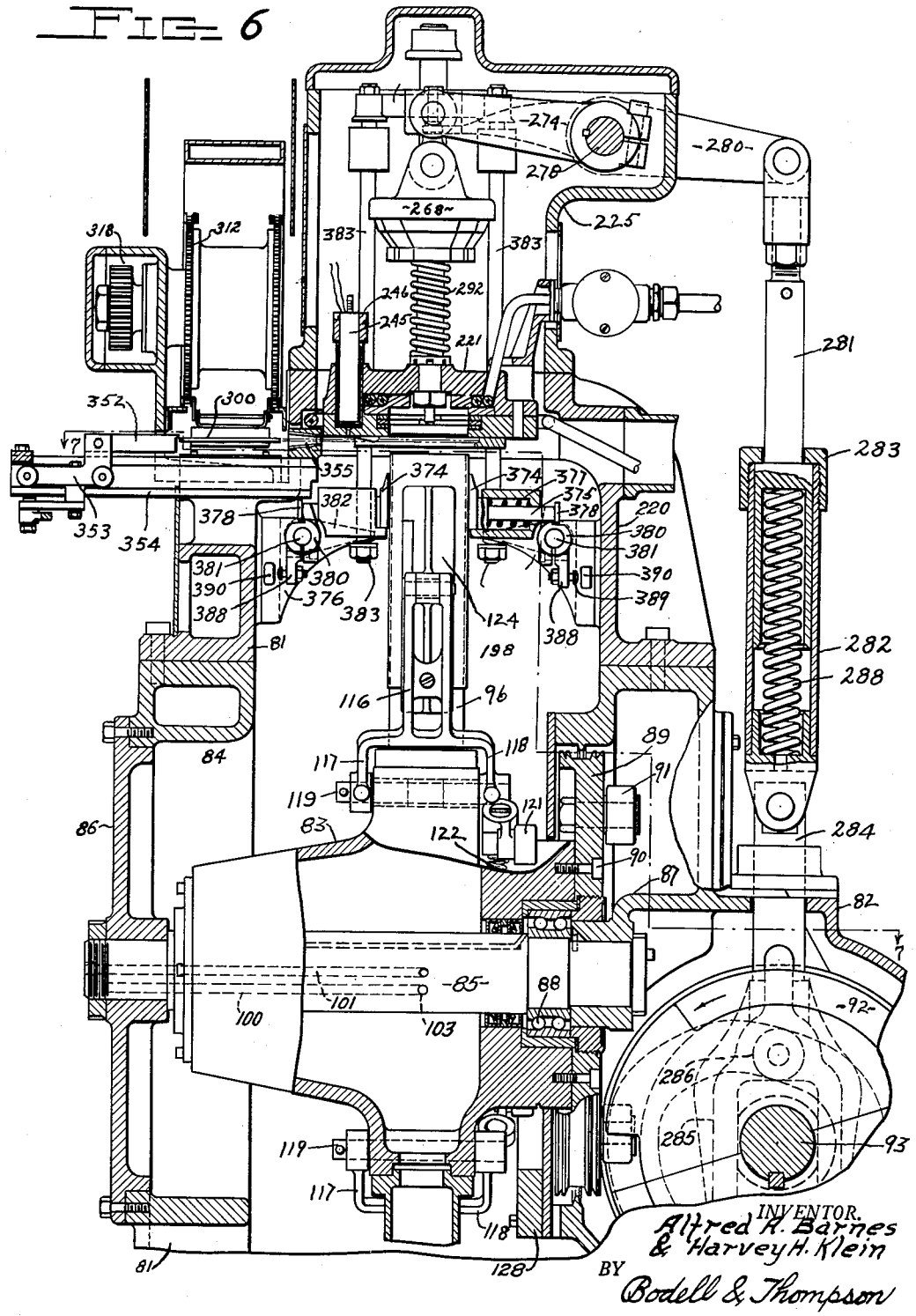

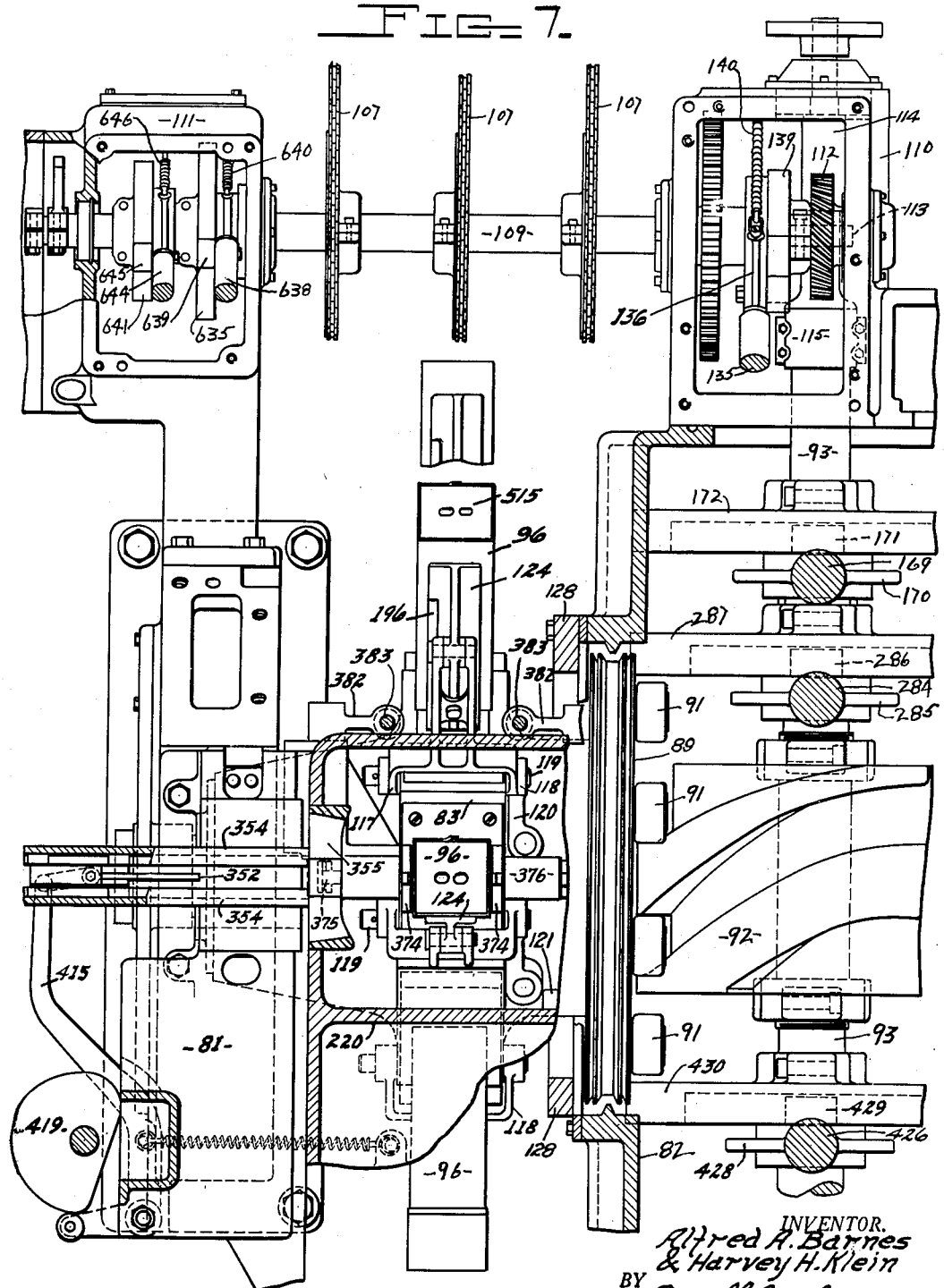

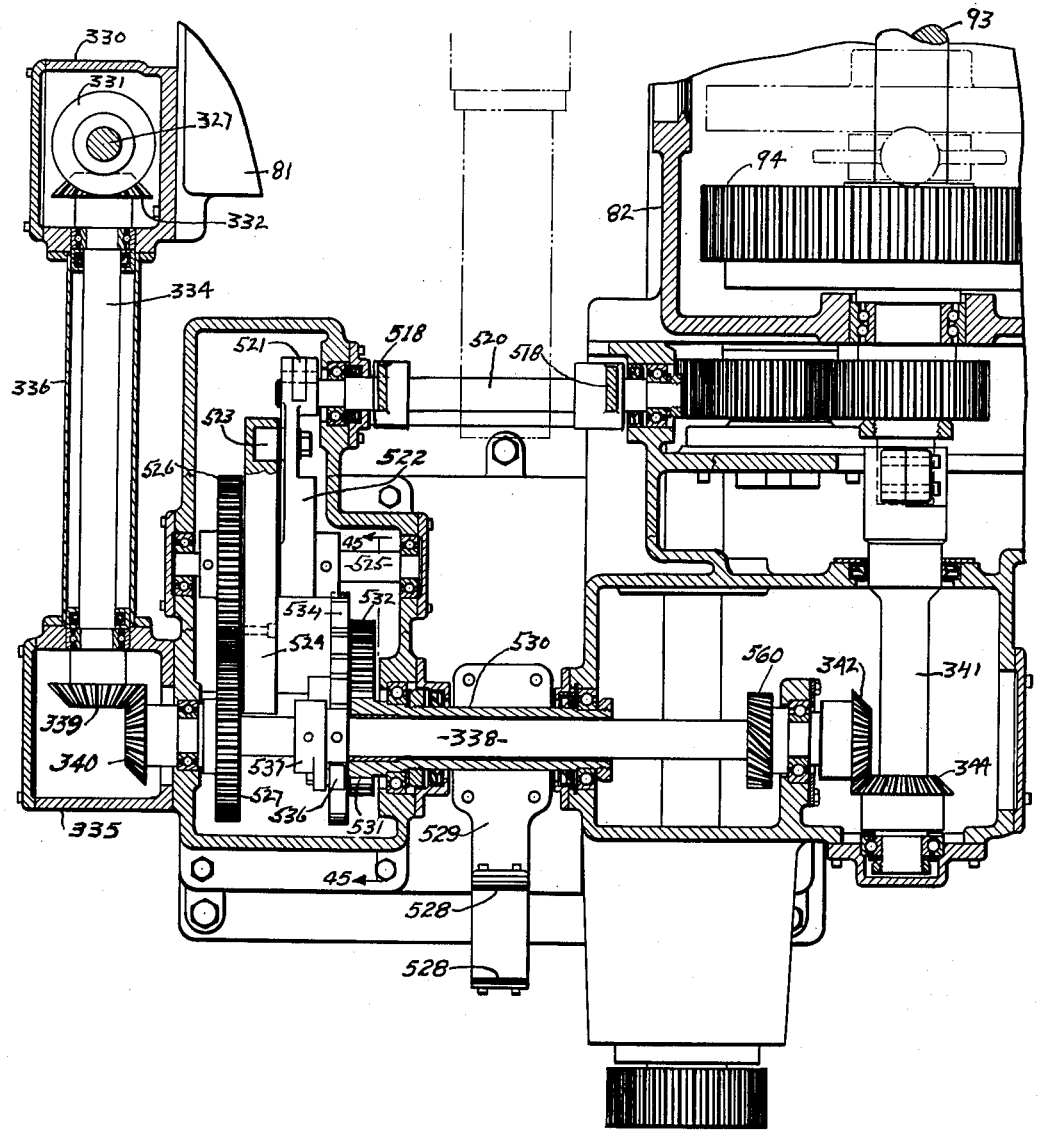

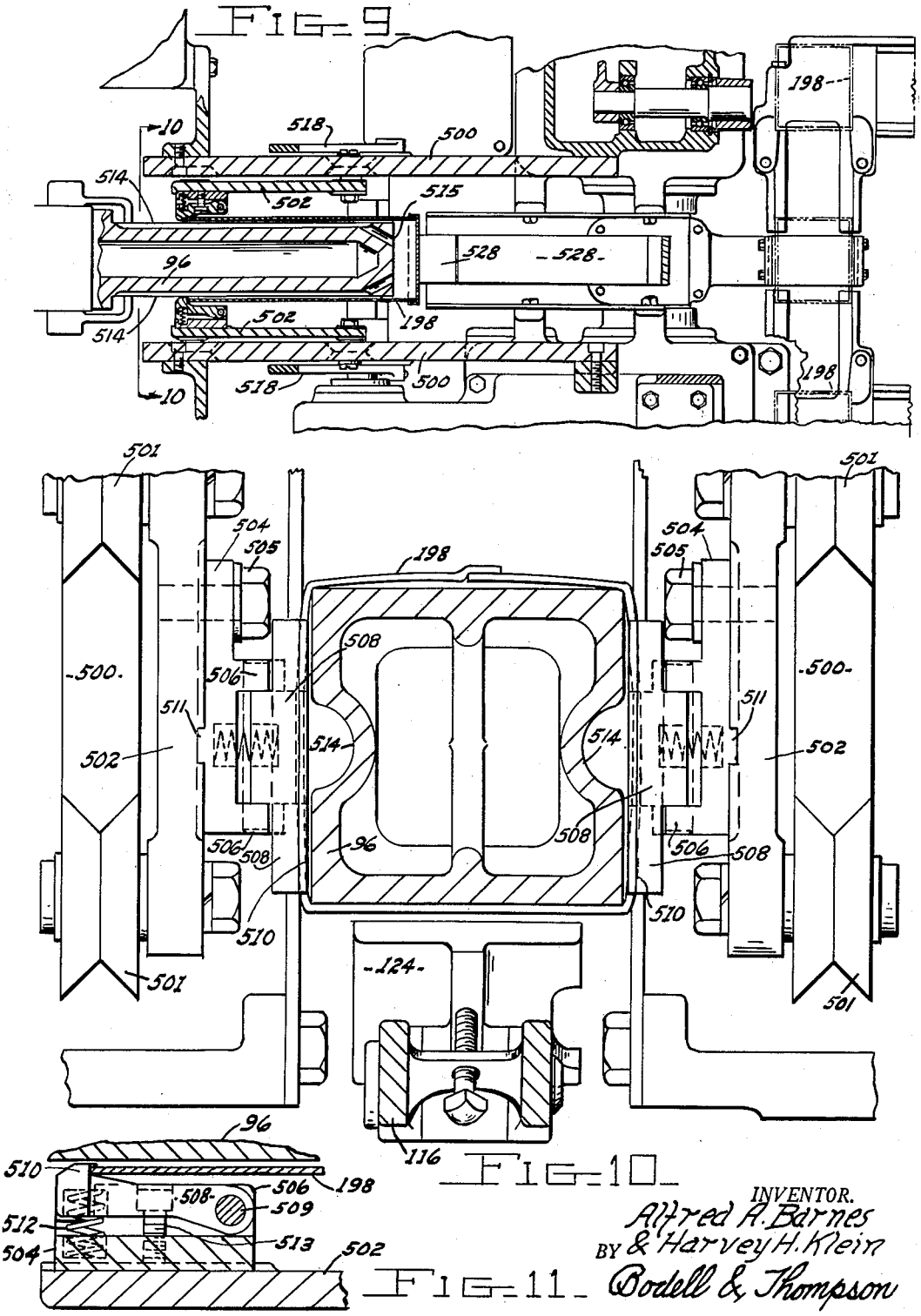

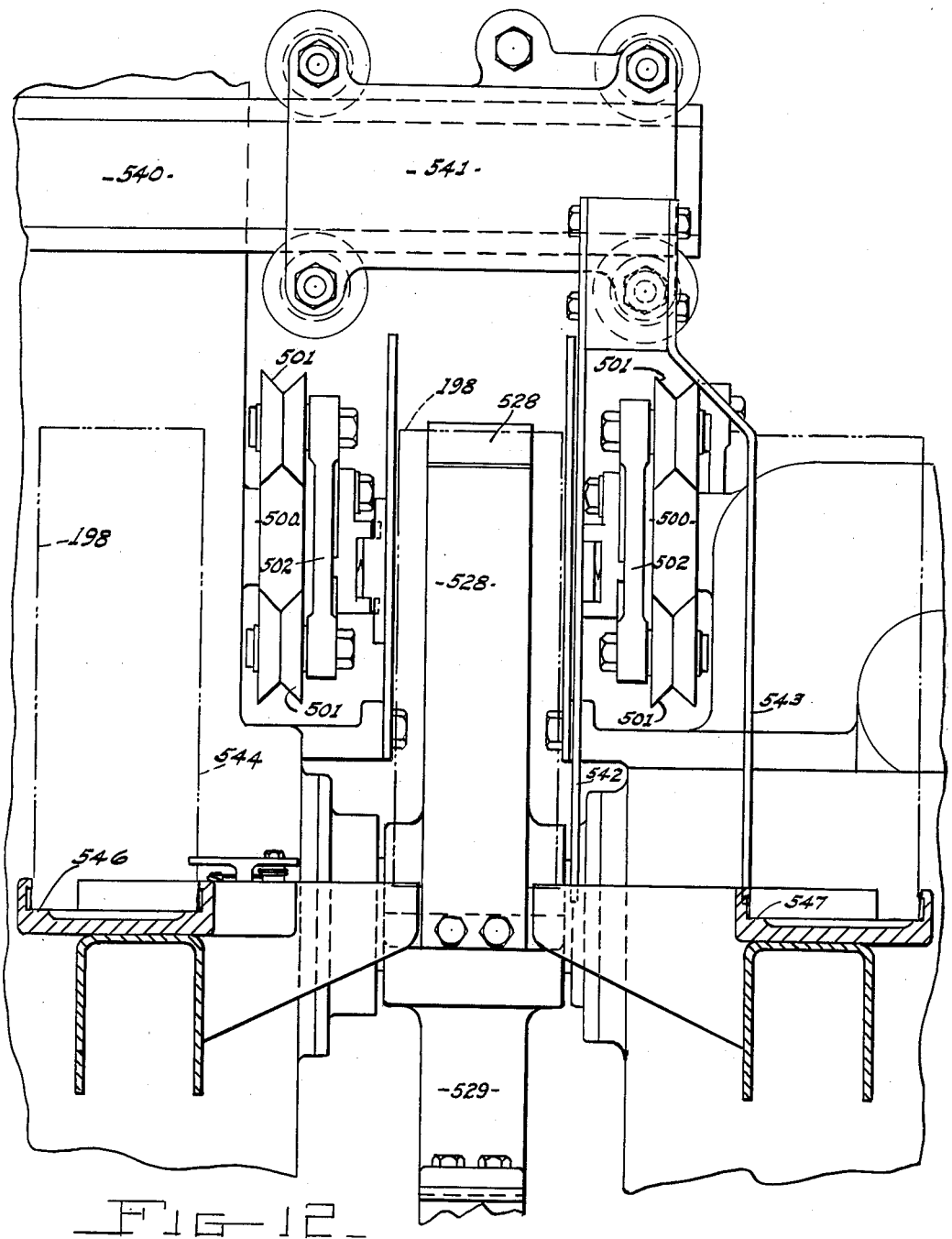

Dec. 13, 1955　　A. A. BARNES ET AL　　2,726,583
APPARATUS FOR FORMING OPEN-ENDED CARTONS
Filed June 17, 1949　　32 Sheets-Sheet 12

INVENTOR.
Alfred A. Barnes
& Harvey H. Klein
BY
Bodell & Thompson
ATTORNEYS

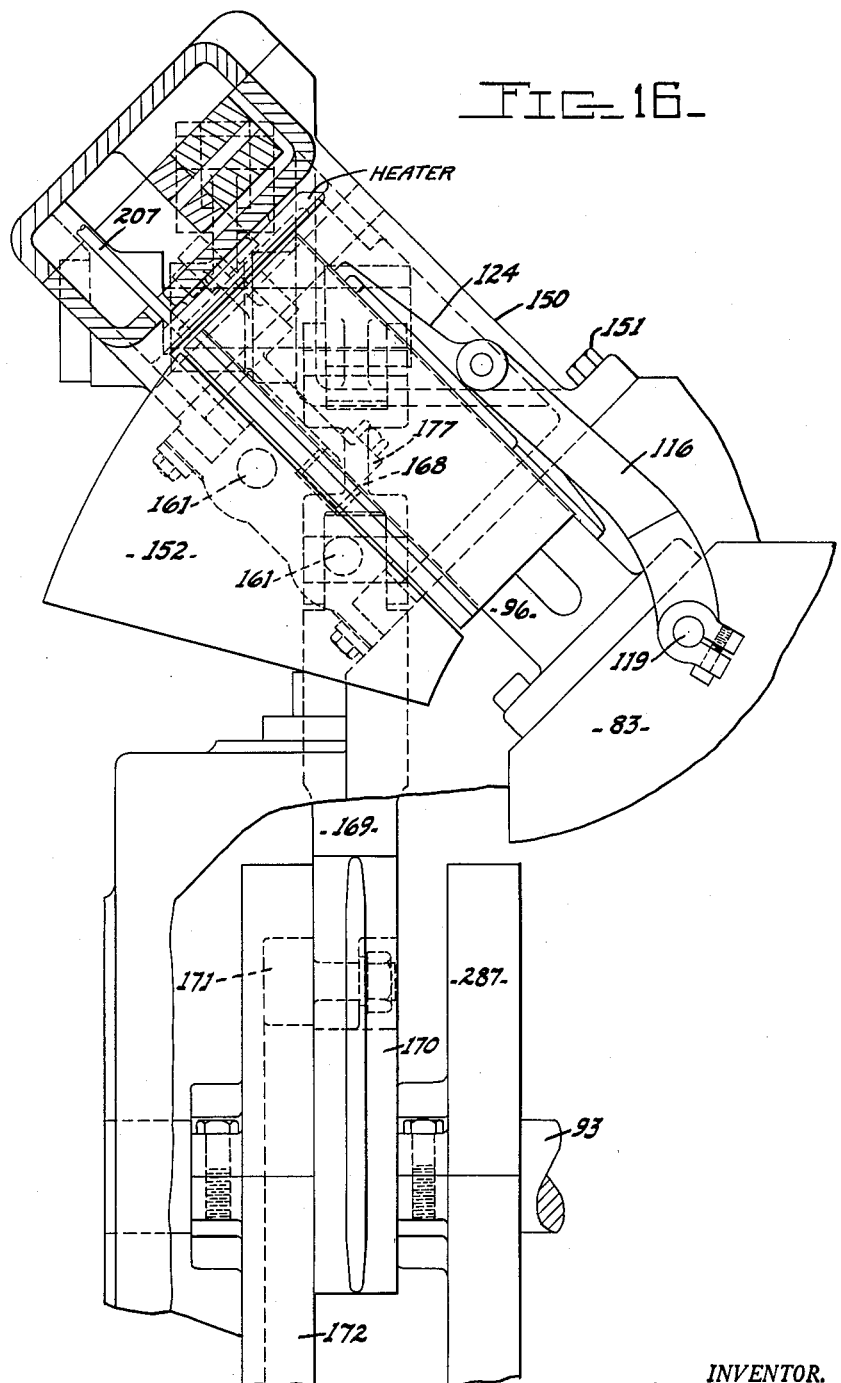

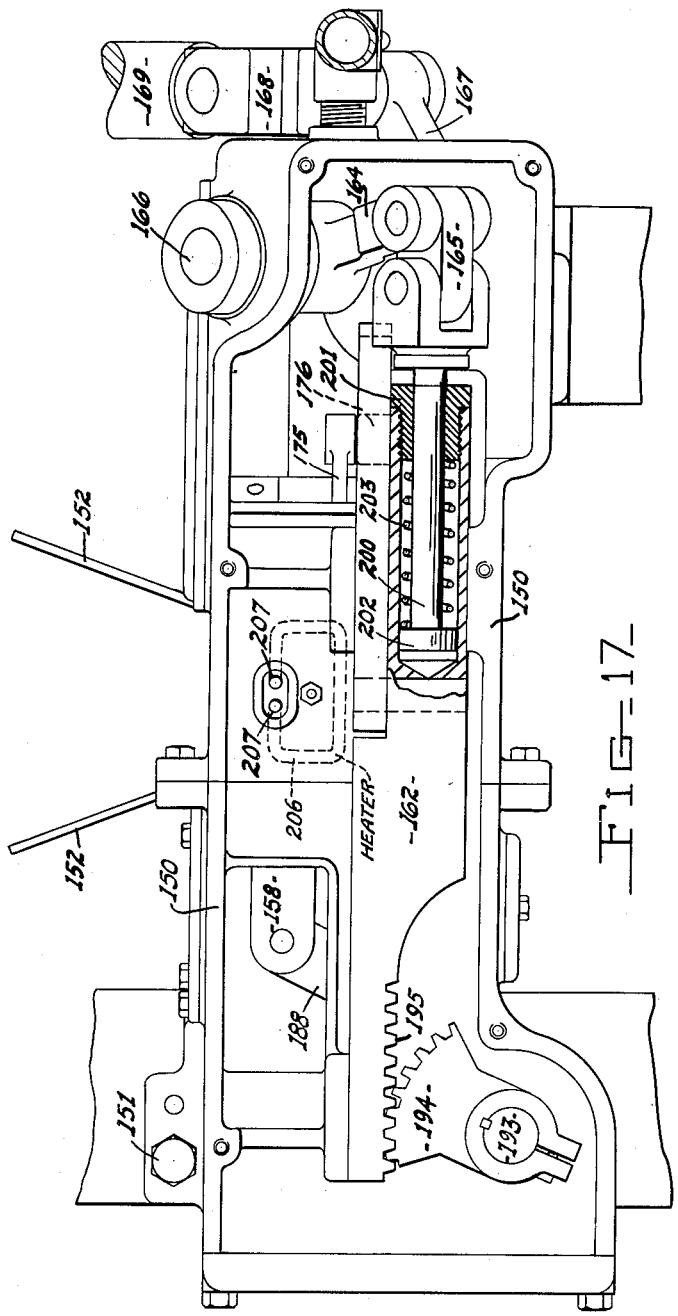

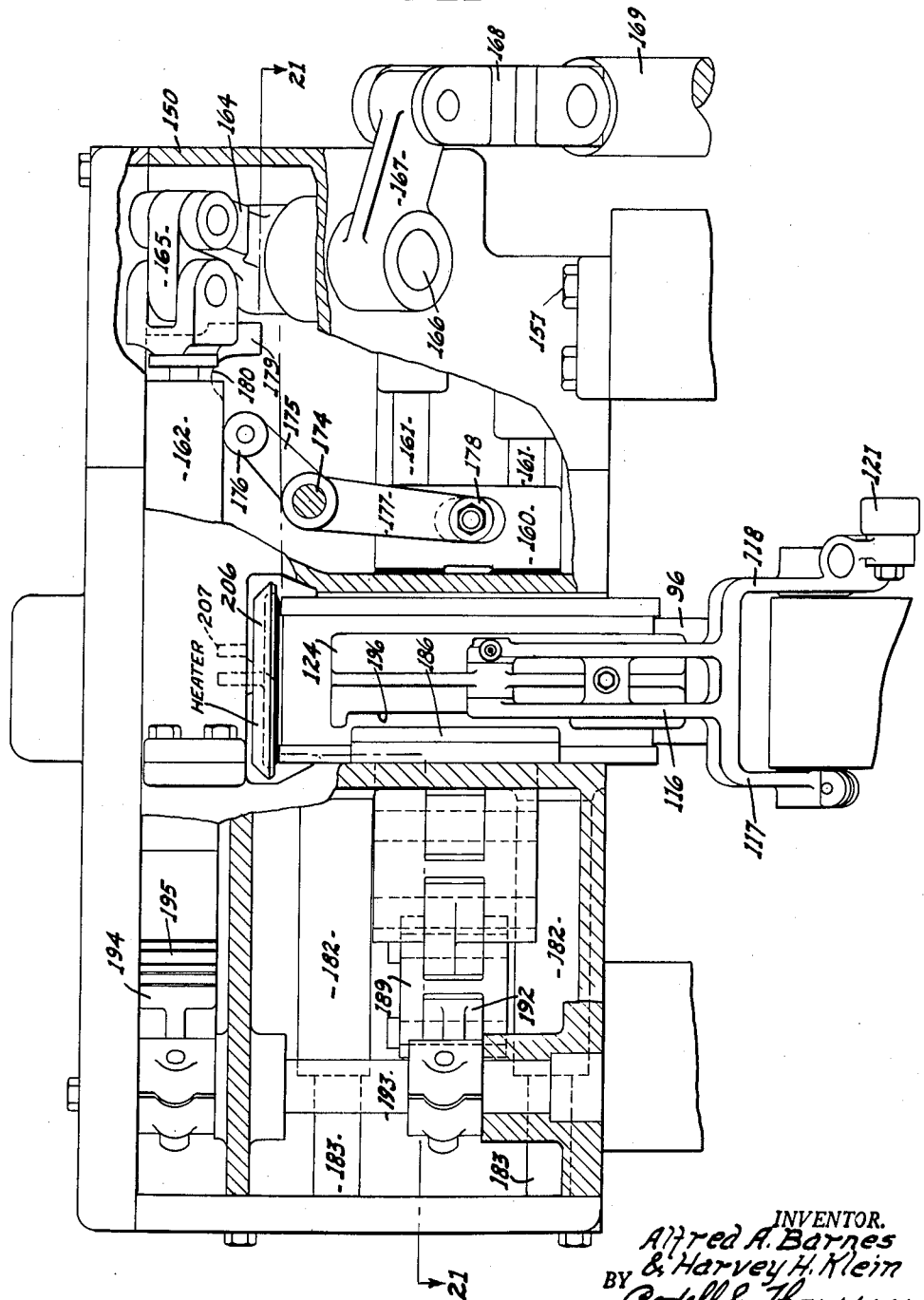

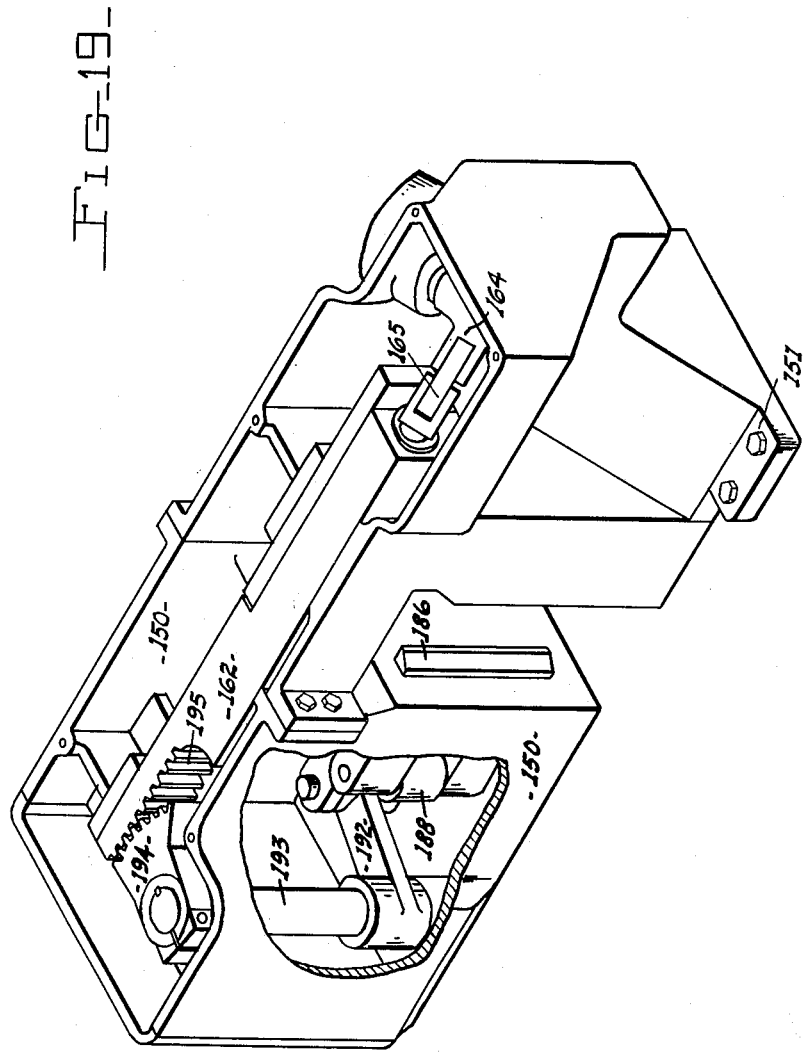

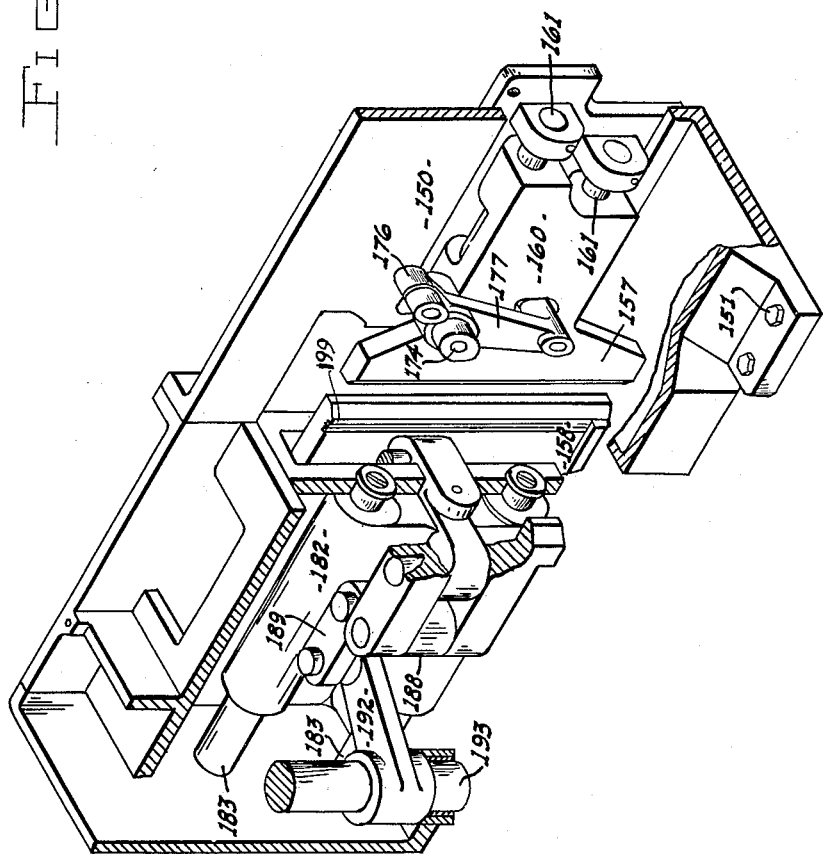

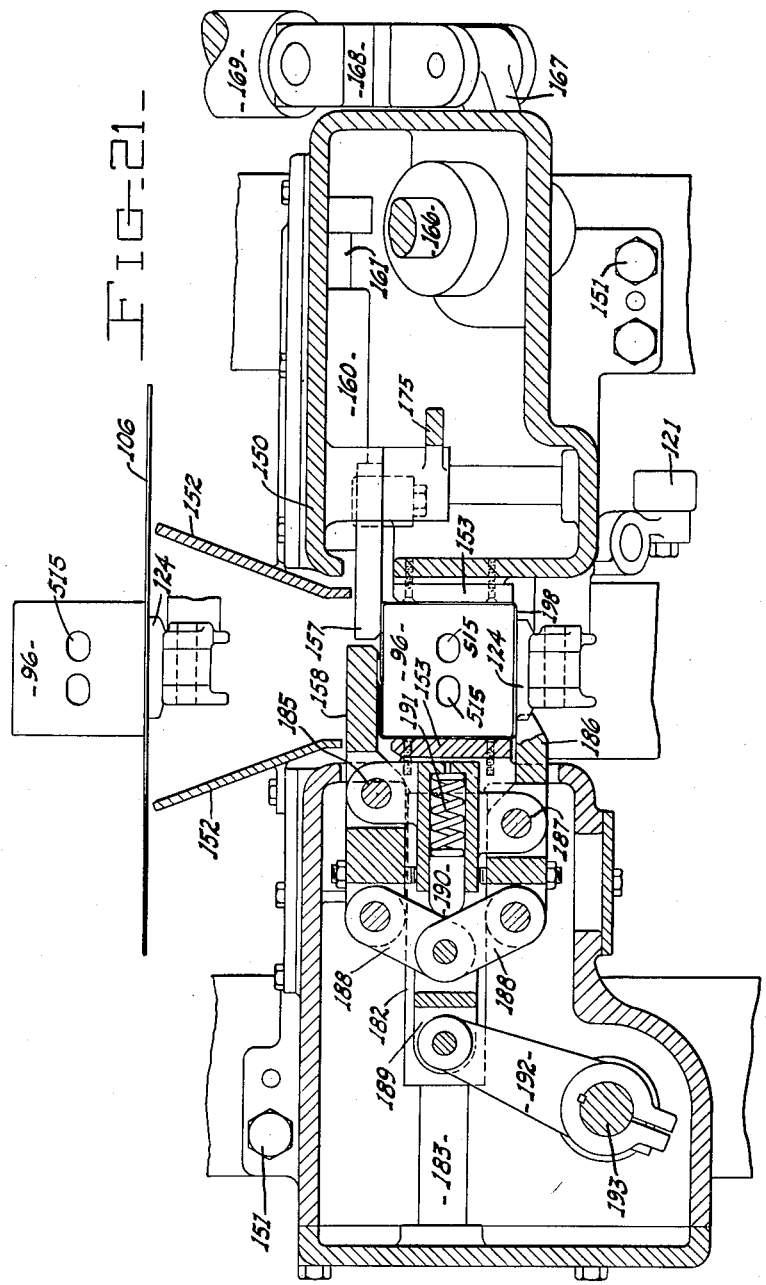

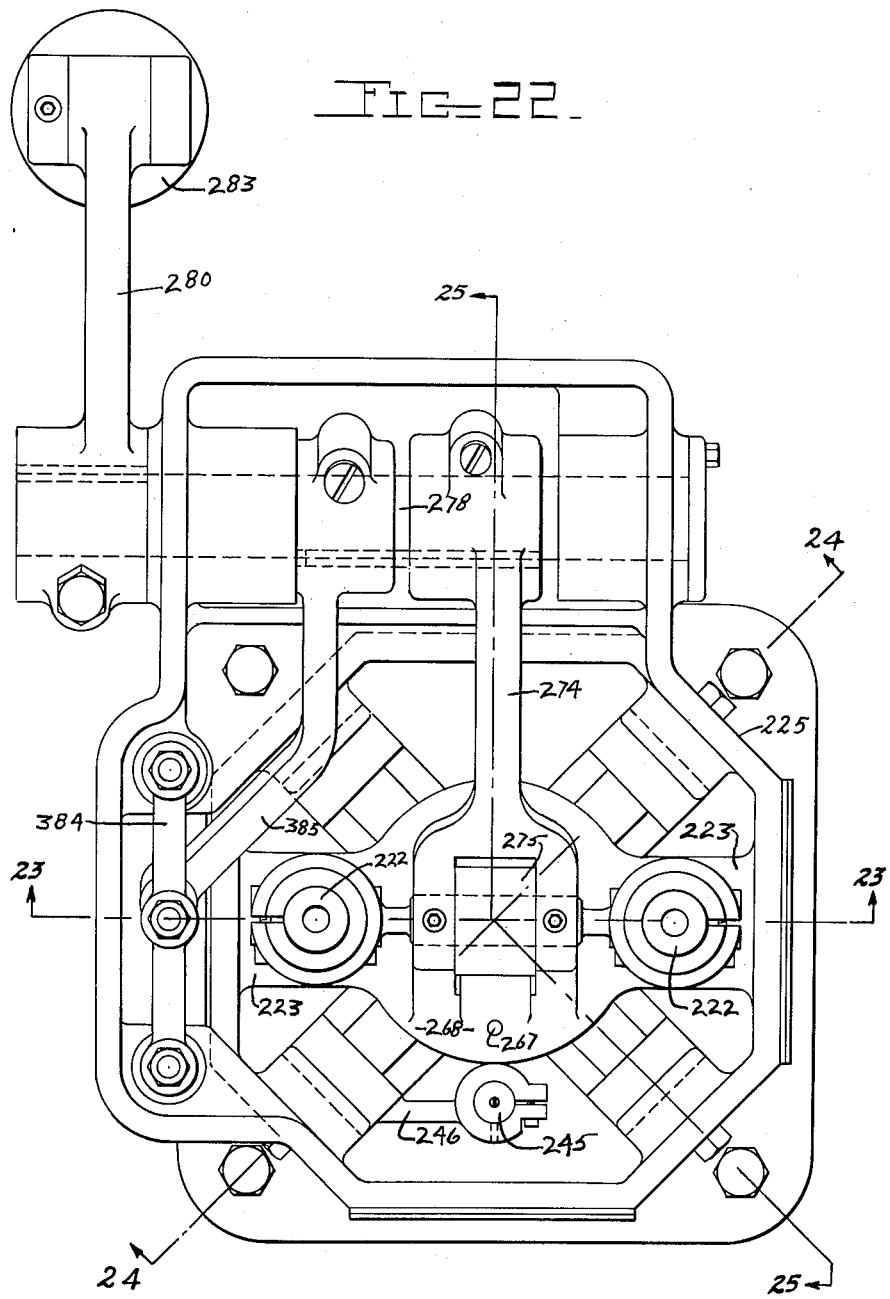

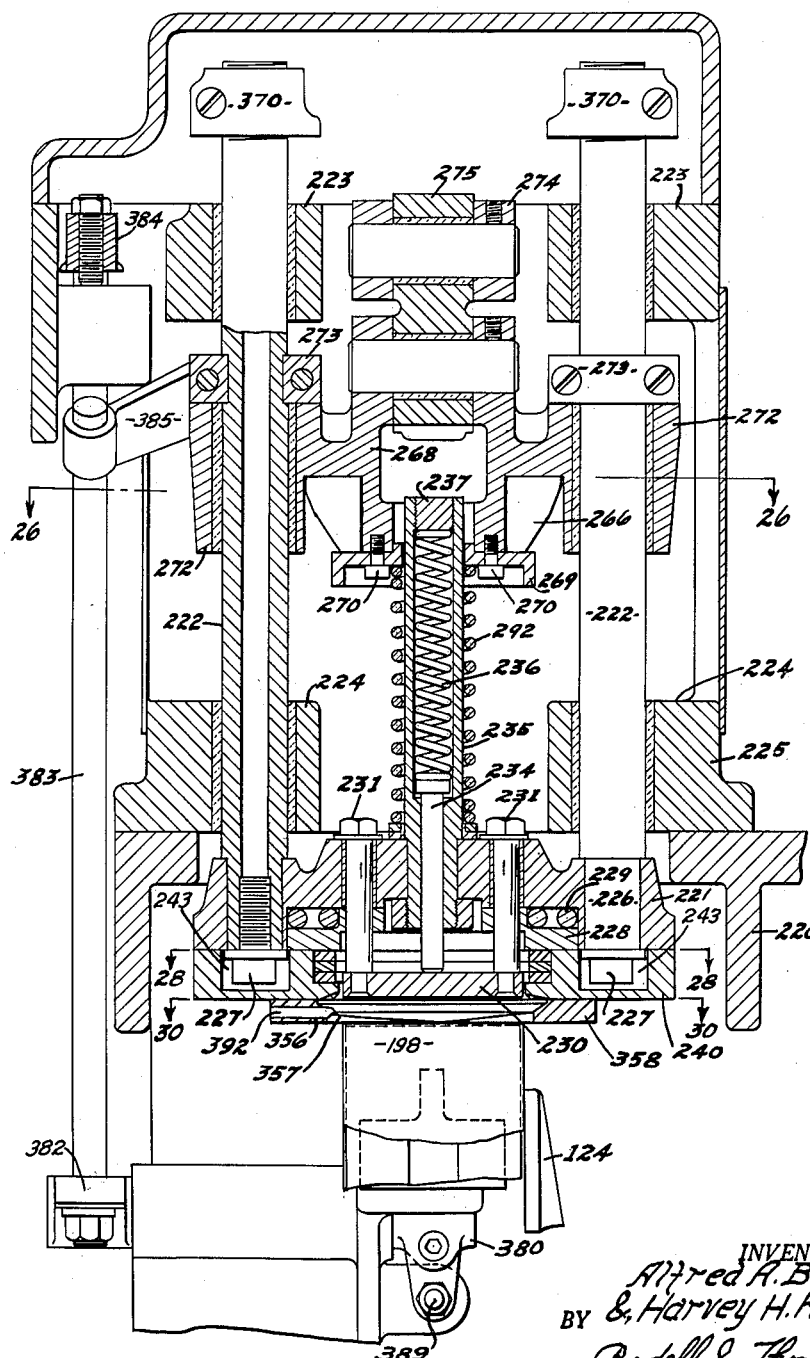

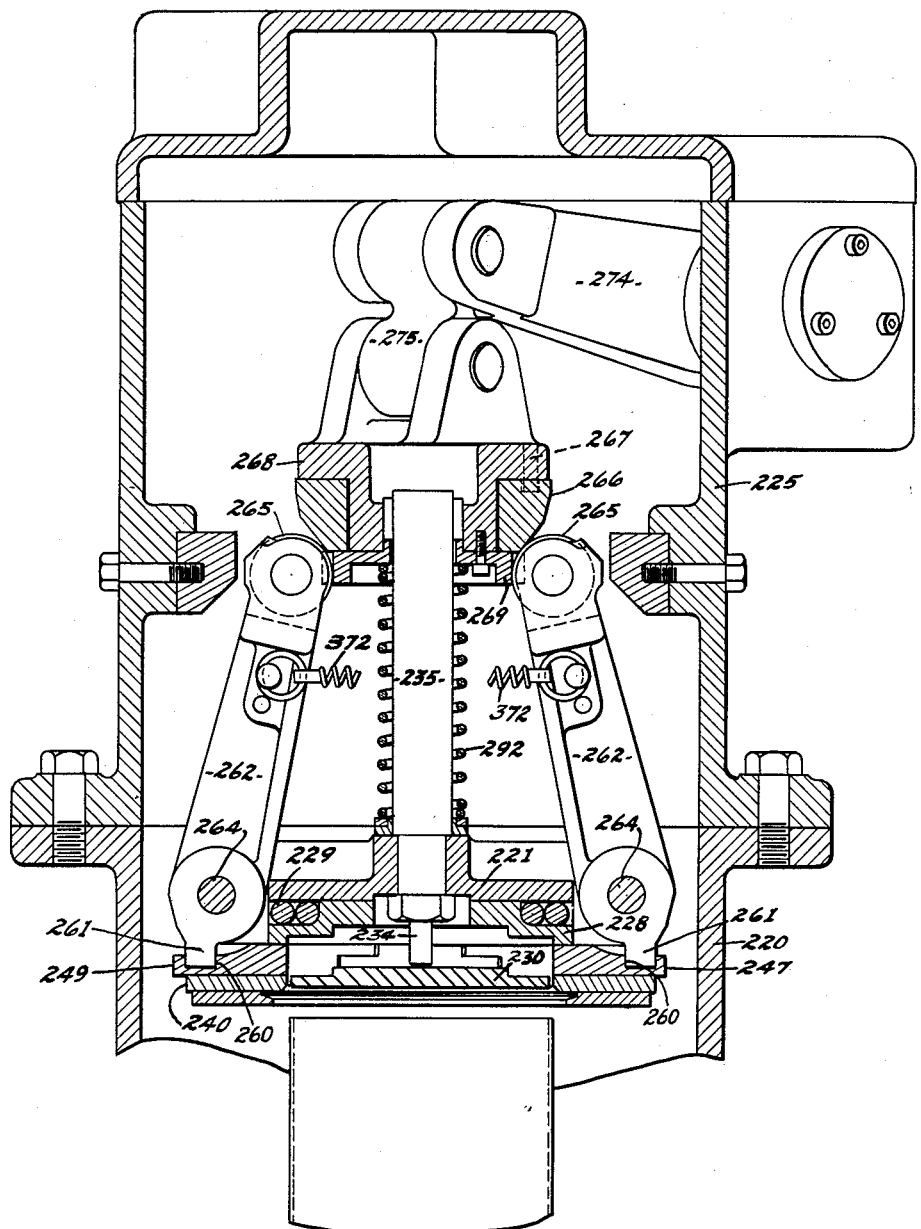

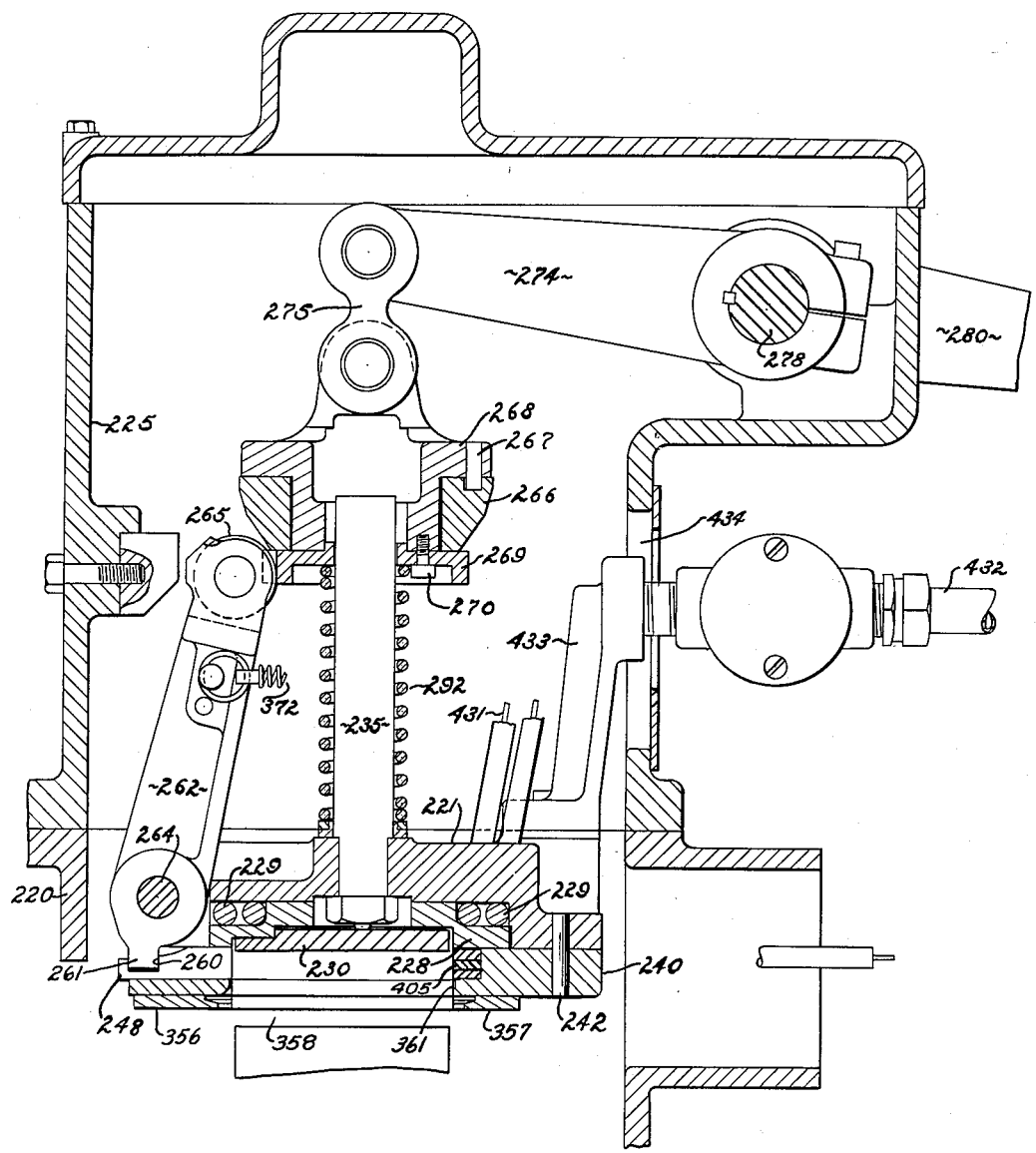

Dec. 13, 1955   A. A. BARNES ET AL   2,726,583
APPARATUS FOR FORMING OPEN-ENDED CARTONS
Filed June 17, 1949   32 Sheets-Sheet 23
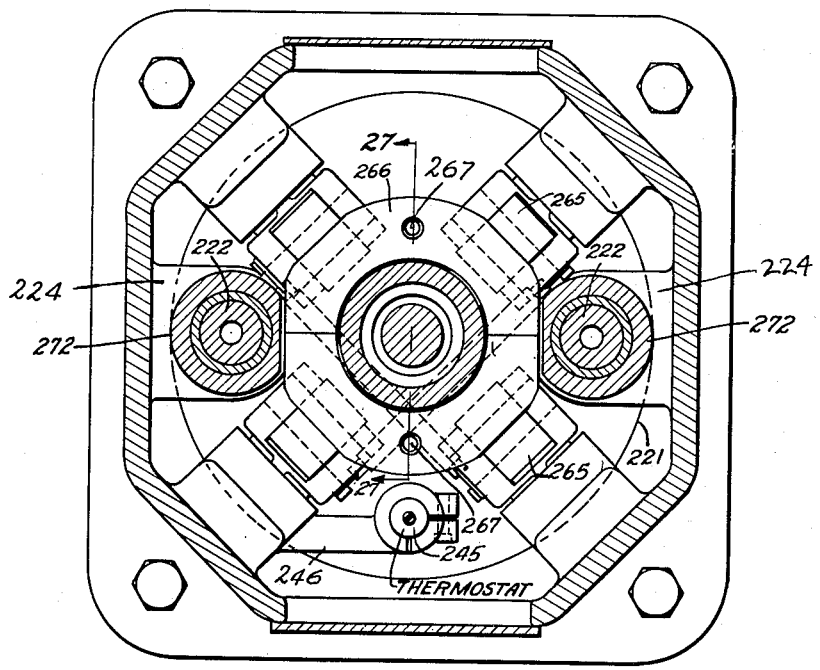
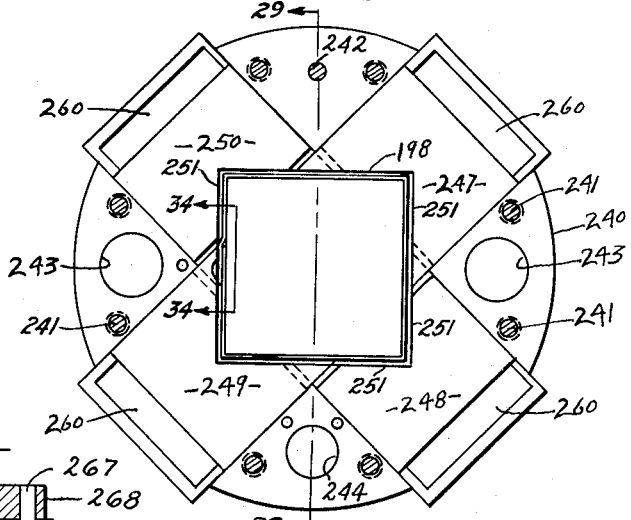
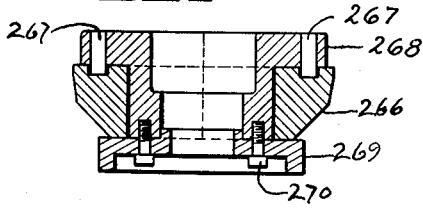
INVENTOR.
Alfred A. Barnes
& Harvey H. Klein
BY Bodell & Thompson
ATTORNEYS

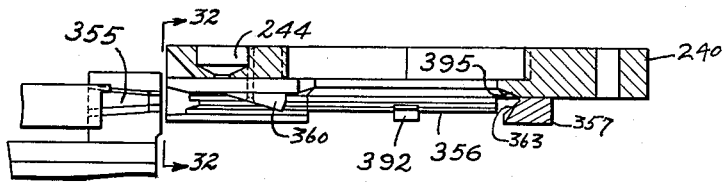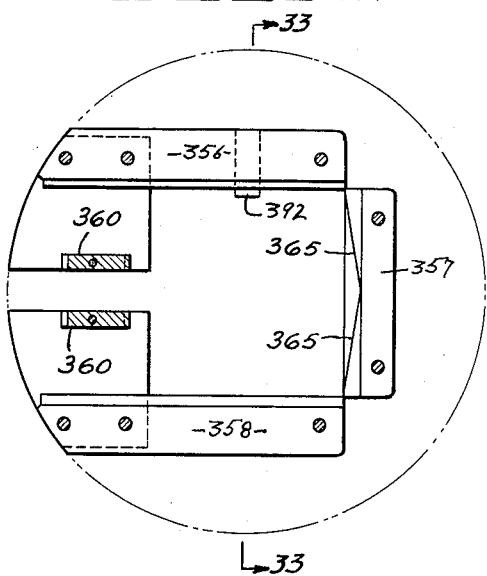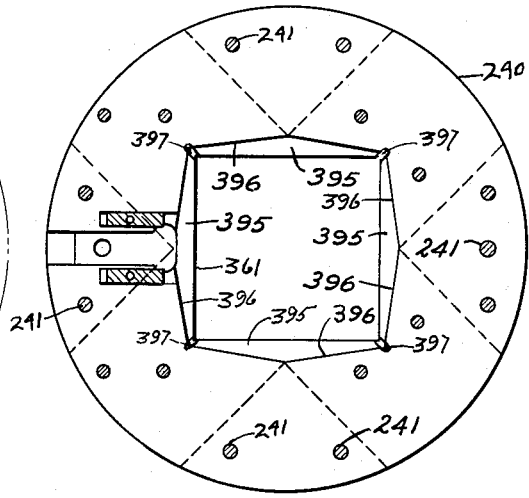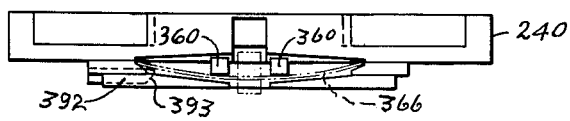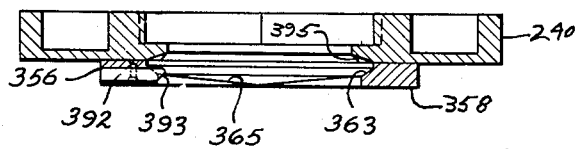

Dec. 13, 1955  A. A. BARNES ET AL  2,726,583
APPARATUS FOR FORMING OPEN-ENDED CARTONS
Filed June 17, 1949  32 Sheets-Sheet 25
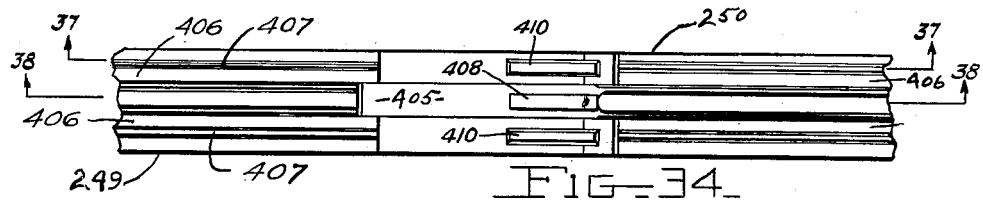
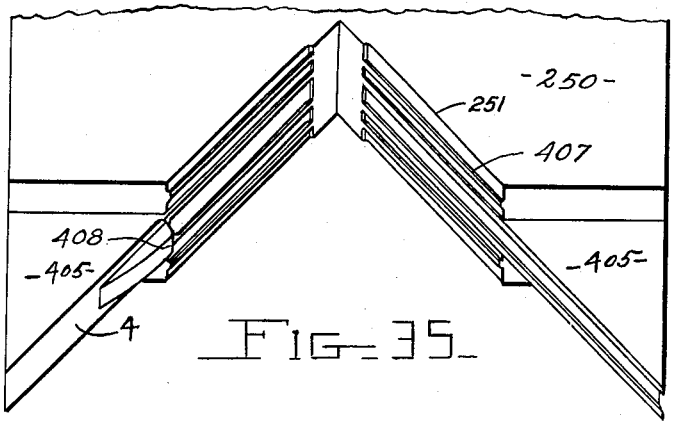
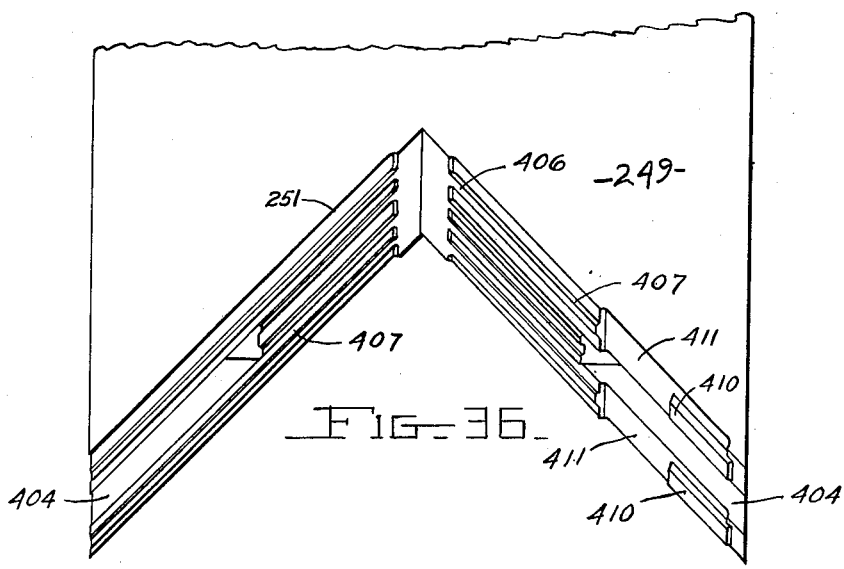
INVENTOR.
Alfred A. Barnes
& Harvey H. Klein
BY
Bodell & Thompson
ATTORNEYS Dec. 13, 1955   A. A. BARNES ET AL   2,726,583
APPARATUS FOR FORMING OPEN-ENDED CARTONS
Filed June 17, 1949   32 Sheets-Sheet 26
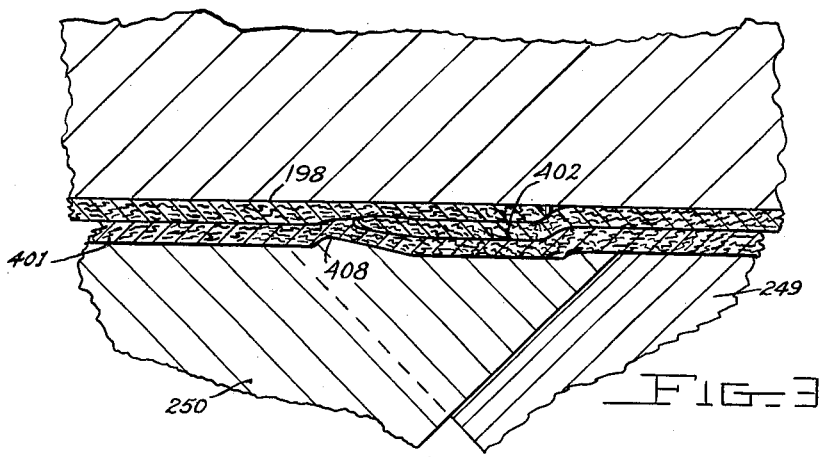
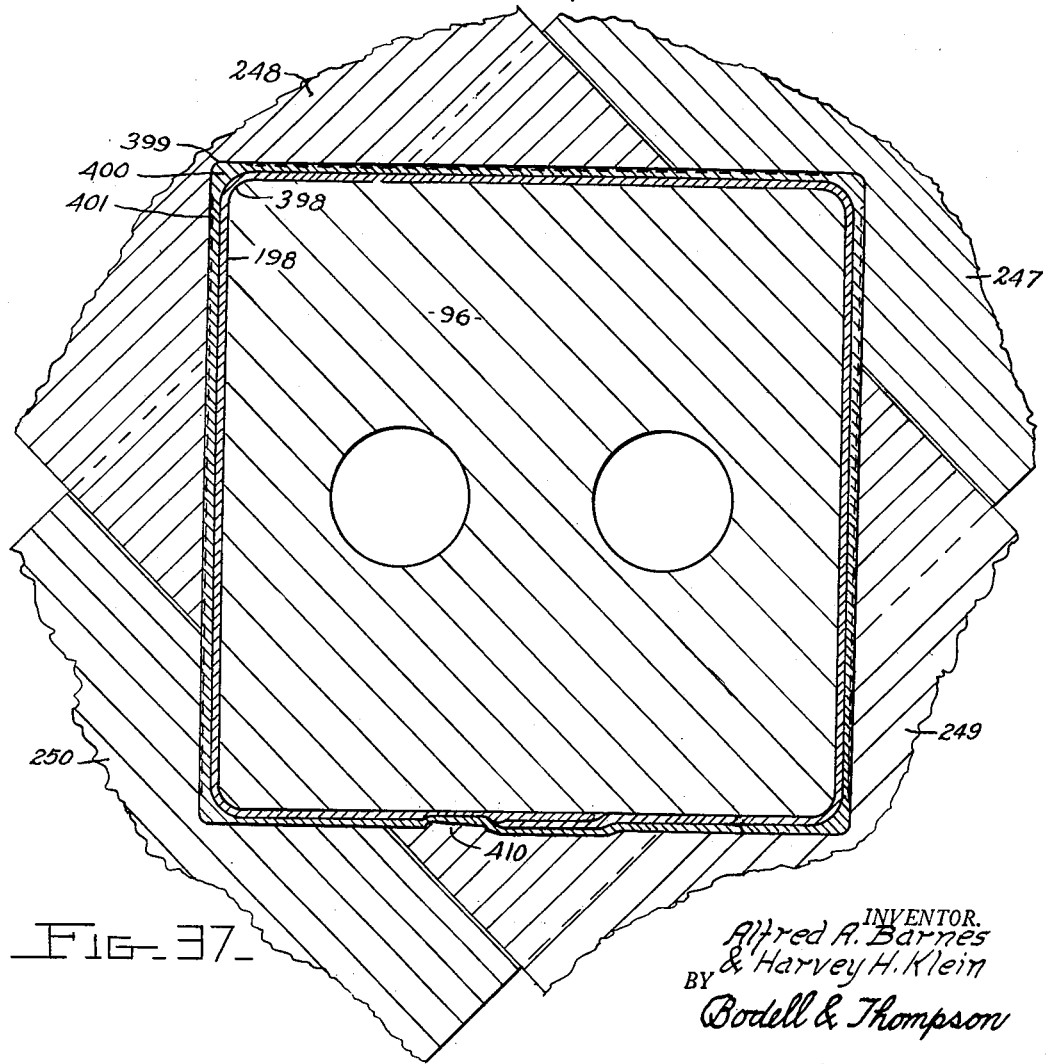
INVENTOR.
Alfred A. Barnes
& Harvey H. Klein
BY Bodell & Thompson
ATTORNEYS

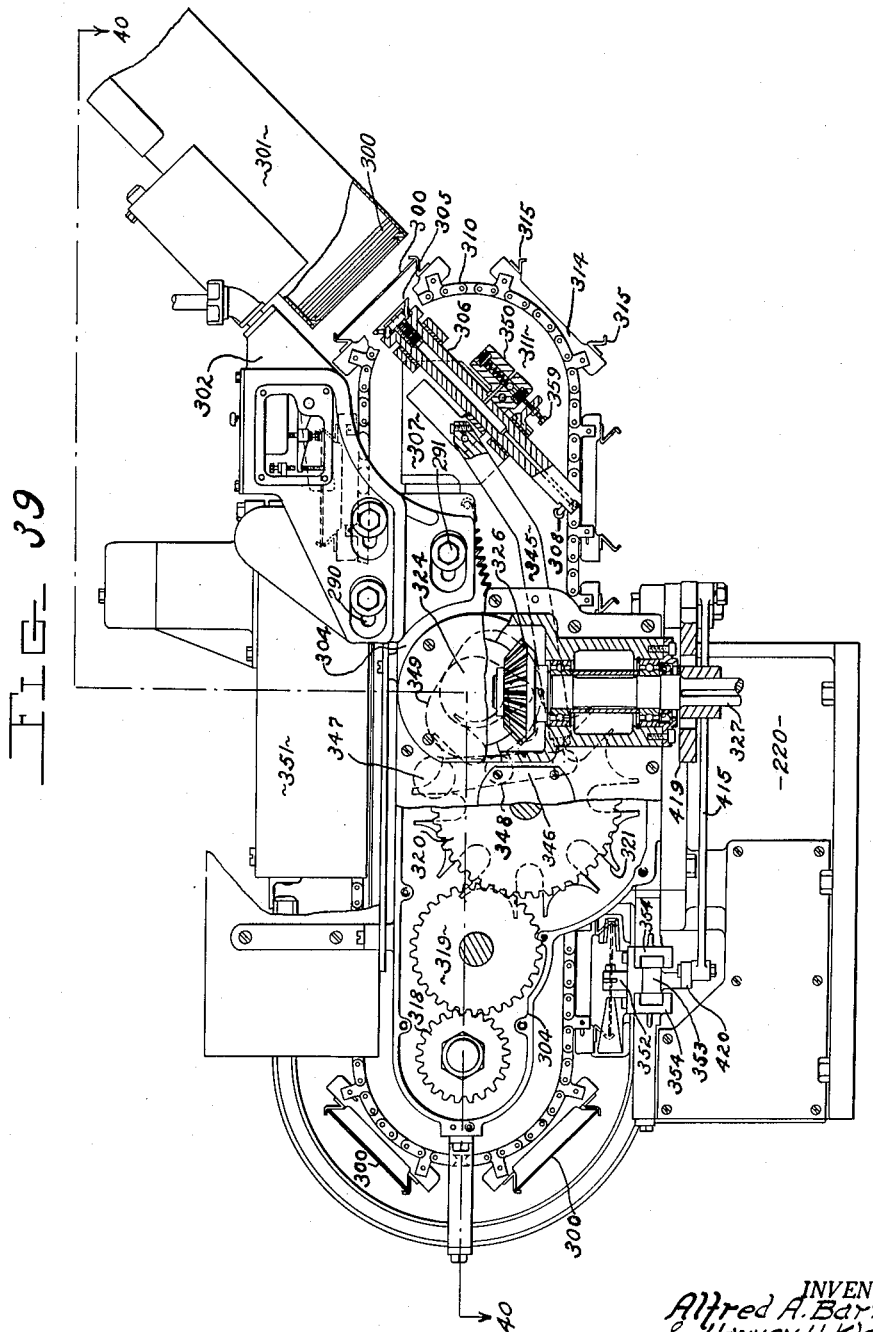

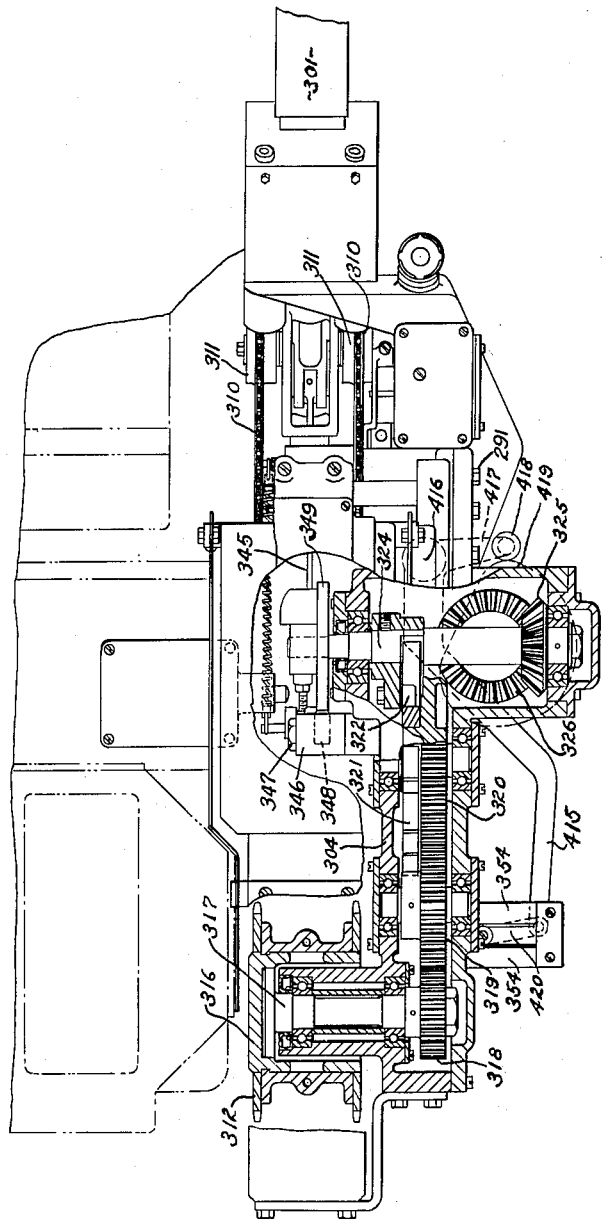

Dec. 13, 1955  A. A. BARNES ET AL  2,726,583
APPARATUS FOR FORMING OPEN-ENDED CARTONS
Filed June 17, 1949  32 Sheets—Sheet 29

INVENTOR.
Alfred A. Barnes
BY & Harvey H. Klein
Bodell & Thompson
ATTORNEYS

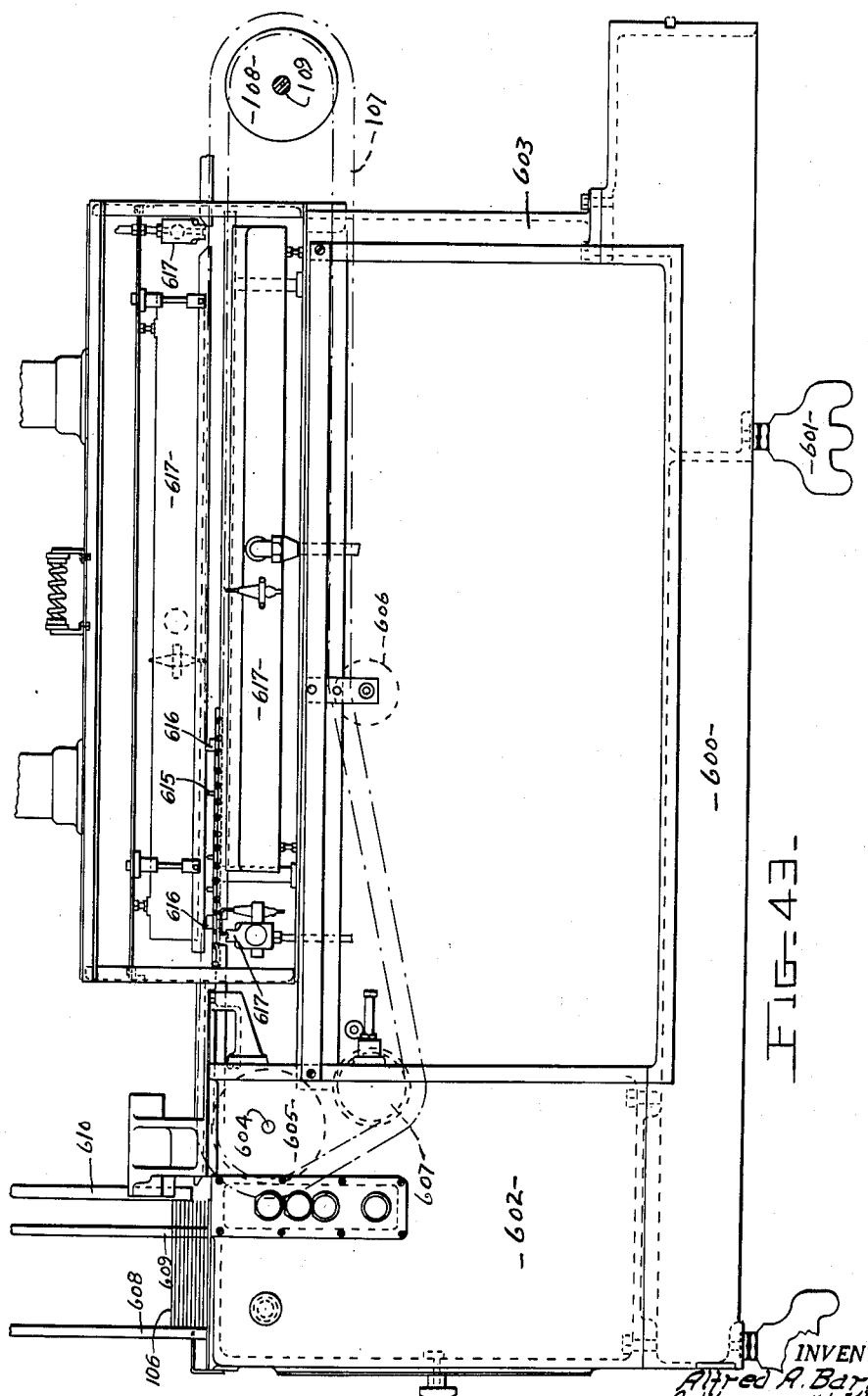

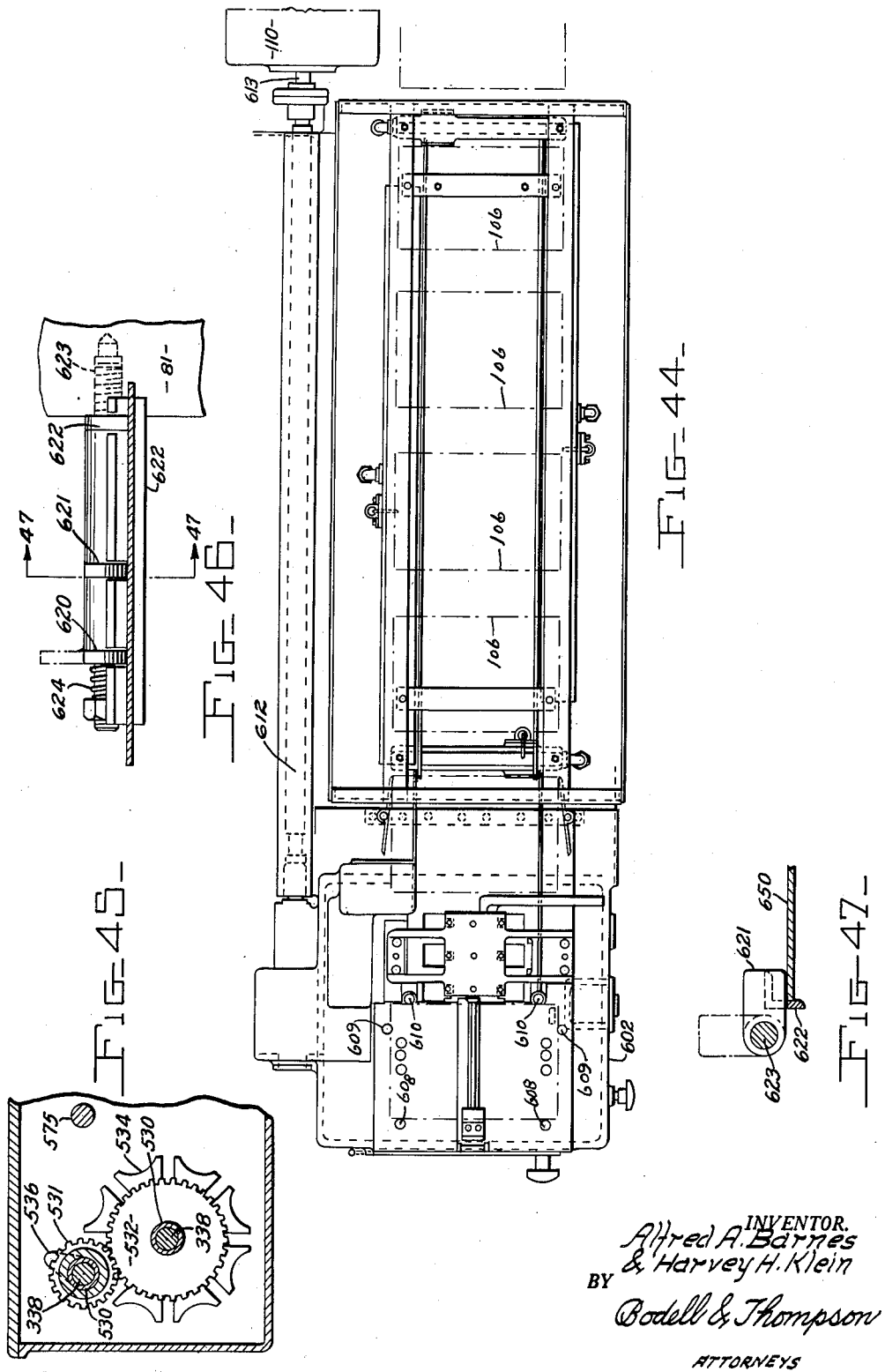

United States Patent Office 2,726,583
Patented Dec. 13, 1955

2,726,583
APPARATUS FOR FORMING OPEN-ENDED CARTONS

Alfred A. Barnes and Harvey H. Klein, Syracuse, N. Y., assignors to Oswego Falls Corporation, Fulton, N. Y., a corporation of New York Application June 17, 1949, Serial No. 99,818

9 Claims. (Cl. 93—39.2)

This invention relates to a machine for forming cartons from flat blanks of sheet fibrous material, such as paperboard.

The invention has as an object a machine of the type referred to embodying a structure for automatically forming a flat blank of sheet material into a tubular body formation, forming a bottom end closure from a flat blank of sheet material, applying the end closure to one end of the tubular body, sealing the same to the body in liquid tight relation and delivering the formed carton with the open end upward.

The invention has as a further object a machine of the type referred to embodying a structure which is particularly rigid and durable and capable of forming such liquid tight cartons with great precision and at a high production rate.

The invention consists in the novel features and in the combinations and constructions hereinafter set forth and claimed.

In describing this invention, reference is had to the accompanying drawings in which like characters designate corresponding parts in all the views.

Figure 1 is a side elevational view of a machine embodying our invention.

Figure 2 is an end elevational view looking to the right, Figure 1.

Figure 3 is an end elevational view looking to the left, Figure 1.

Figure 4 is a top plan view of the structures shown in Figures 1, 2 and 3.

Figure 5 is a view taken substantially on line 5—5, Figure 4.

Figure 6 is a view taken on lines 6—6, Figures 1 and 4.

Figure 7 is a view taken on line 7—7, Figure 6.

Figure 8 is a view taken on line 8—8, Figures 1 and 3.

Figure 9 is a view taken on line 9—9, Figure 5.

Figure 10 is a view taken on line 10—10, Figure 9.

Figure 11 is an enlarged view of one of the carton stripping members shown in Figure 9.

Figure 12 is a view on line 12—12, Figure 5.

Figure 16 is an elevational view of the blank folding unit looking to the right, Figure 2.

Figure 17 is a view of the blank folding unit with the cover of the housing removed, as indicated by line 17—17, Figure 1, and with parts in section.

Figure 18 is a view of the blank folding unit, as indicated by line 18—18, Figure 1, with parts of the rear wall of the housing broken away.

Figure 19 is a perspective view of the blank folding unit with a part of the housing broken away, and the cover removed.

Figure 20 is a view of the blank folding unit with the housing broken away showing the movable blank folding members in perspective.

Figure 21 is a view taken on line 21—21, Figure 18.

Figure 22 is a top plan view of the bottom forming and applying head with the cover of the housing removed, as indicated on line 22—22, Figure 2.

Figure 23 is a vertical sectional view of the forming and applying head taken on line 23—23, Figure 22.

Figure 24 is a view similar to Figure 23 taken on line 24—24, Figure 22.

Figure 25 is a vertical sectional view taken on line 25—25, Figure 22.

Figure 26 is a view taken on line 26—26, Figure 23.

Figure 27 is a sectional view of the jaw actuating cam and contiguous parts taken on line 27—27, Figure 26.

Figure 28 is a view taken on line 28—28, Figure 23.

Figure 29 is a view taken on line 29—29, Figure 28.

Figure 30 is a bottom plan view of the closure blank guide and positioning members, as indicated by line 30—30, Figure 23.

Figure 31 is a bottom plan view of the die plate shown in Figure 28.

Figure 32 is a side elevational view of the die structure shown in Figure 29, as indicated by line 32—32, Figure 29.

Figure 33 is a cross sectional view of the die structure at right angles to that shown in Figure 29, the view being indicated by line 33—33, Figure 30.

Figure 34 is an elevational view of contiguous portions and overlapping portions of adjacent end closure compressing jaws, the view being taken by line 34—34, Figure 28.

Figure 35 is a perspective view of the blank engaging face of one of the sealing jaws of the end closure forming and applying head.

Figure 36 is a view, similar to Figure 35, of a jaw arranged adjacent to the jaw shown in Figure 35, the overlapping portions of these jaws being shown in Figure 34.

Figure 37 is a cross sectional view taken through a mandrel adjacent the outer end thereof and through the end portion of a carton on the mandrel, the flange of the bottom or end closure member and the sealing jaws medial of their thickness, as indicated by line 37—37, Figure 34.

Figure 38 is an enlarged sectional view of the lower central portion of Figure 37 at the side wall seam of the carton and taken on a plane indicated by line 38—38, Figure 34.

Figure 39 is a side elevational view of the bottom blank conditioning unit with parts broken away and parts in section.

Figure 40 is a view taken on line 40—40, Figure 39.

Figure 43 is a side elevational view of the carton body blank feeding and conditioning unit.

Figure 44 is a top plan view of the structure shown in Figure 43.

Figure 45 is a view taken on a line corresponding to line 45—45, Figure 8.

Figure 46 is a view taken on line 46—46, Figure 13.

Figure 47 is a view taken on line 47—47, Figure 13.

Figure 13:
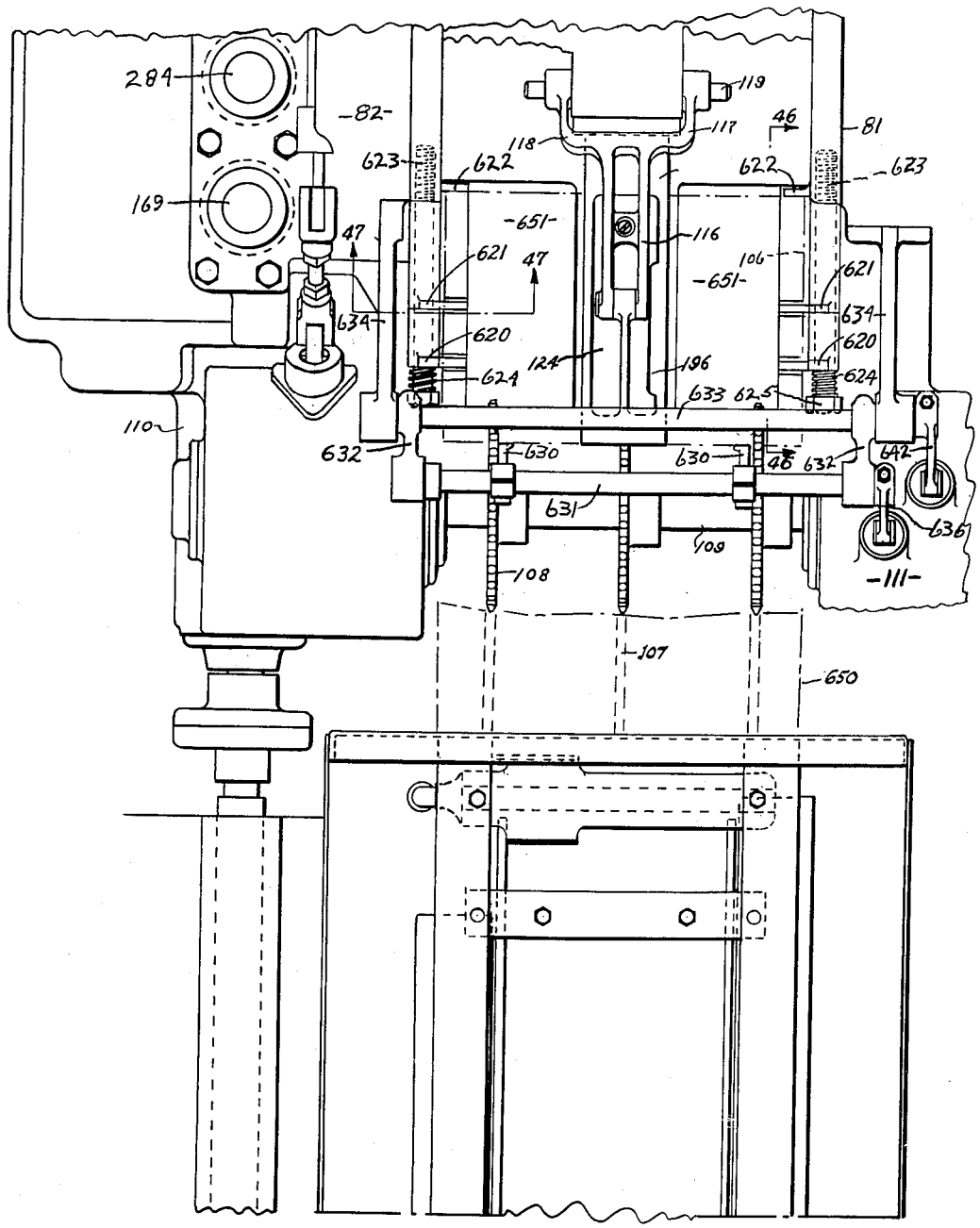
Figure 13 is a plan view of the left end of the machine shown in Figure 1 and of the blank feeding and conditioning mechanism.

The machine consists generally of a frame in which there is journalled on a horizontal axis a turret carrying a plurality of circumferentially spaced apart mandrels extending radially from the axis of the turret. These mandrels are rectangular in cross section, and drive mechanism is provided for indexing or effecting intermittent rotation of the turret to move the mandrels from a blank receiving station through a blank folding station, a bottom end closure forming, applying and sealing station, a second sealing station, to a carton stripping station. The mandrels are in horizontal position at the blank receiving station and the carton stripping station.

Means is provided for supporting a supply of blanks, for withdrawing the blanks successively from the supply and advancing them to the blank receiving station. The blanks are formed of sheet material, such as paperboard, and are coated on at least one side with an impervious thermoplastic material.

The blanks fed to the blank receiving station are in flat form and are scored to provide five panels. The blanks are positioned on one side of the mandrels and clamped thereagainst. When the turret is indexed to move the mandrel with the blank thereon to the blank folding station, the laterally extending portions of the blank are folded about opposite sides of the mandrel, whereby the three central panels of the blank are then folded about three sides of the mandrel. The folding unit includes movable folding members to fold the two remaining panels against the fourth side of the mandrel with their edges in overlapping relation to form the side wall seam of a tubular body.

When the turret is indexed to bring the mandrel with the tubular body formed thereon to the end closure forming and applying station, a bottom end closure is formed also from a flat coated blank over the outer end of the tubular formation and is sealed thereto. The turret is then indexed to bring the mandrel with the formed carton thereon in registration with the second sealing unit and is then indexed to move the mandrel to horizontal position whereupon a stripping mechanism is moved into engagement with the inner end of the carton, stripping it axially off from the mandrel into an up-ending member formation. The formed carton is removed and positioned to be conveyed from the machine for filling and then application of a top closure member.

The machine for advancing the completed cartons to the filling unit, filling the cartons and sealing the top ends of the cartons, is disclosed in the copending application of Wilcox et al., Ser. No. 25,944, filed may 8, 1948, now Patent No. 2,692,463, issued October 26, 1954.

The essential parts going to make up the frame of this machine consist of a base member 80 on which are secured a pair of upwardly extending members 81, 82. A hollow turret 83 is journalled between the members 81, 82. The member 81 is formed with a large circular opening 84 sufficient to admit the turret without the mandrels thereon. The turret 83 is journalled on a stationary shaft 85, the outer end of which is supported in a cover plate 86 forming a closure for the opening 84. The inner end of the shaft 85 is mounted in a bracket 87 formed in the side member 82, the turret being journalled on antifriction bearings 88 carried by the shaft 85. An indexing disk 89 is secured to this end of the turret as by screws 90 and carries a plurality of rollers 91 engaged by a cylinder cam 92, see Figures 6 and 7.

The cam 92 is fixed to a main cam shaft 93 journalled in the side member 82 and extending lengthwise of the machine. This shaft has affixed to it a gear 94, Figure 8, operatively connected to a driving motor 95 shown in Figures 1 to 5. The arrangement is such that upon each revolution of the main cam shaft 93, the turret 83 is indexed to advance the mandrels from one station to the next succeeding station.

A plurality of mandrels 96 are mounted on the turret 83, as by screws 97. As here shown, the mandrels are hollow and square in cross section. The turret shaft 85 is provided with an inlet passage 100 and an outlet passage 101. The inlet passage is connected to a conduit 103 arranged in the turret and extending toward the mandrel positioned horizontally at the blank receiving station to the left, Figure 5. A liquid cooling medium is forced in through the inlet 100 and is discharged into the interior of the mandrels positioned at the blank receiving station by the pipe 103. The interior of the turret and the three mandrels positioned below the horizontal, see Figure 5, are filled with this cooling medium, the level being determined by the outlet passage 101.

The blanks 106 are advanced in juxtaposition to the mandrels 96 at the blank receiving station, as by a blank conveyor chain 107, or a plurality of such chains trained over sprockets 108 mounted on shaft 109 extending transversely of the machine and being journalled at its ends in housings 110, 111. The shaft 109 has affixed thereto a gear 112 arranged in the housing 110 and arranged in mesh with a gear 113 mounted on a shaft 114 adjustably secured, as at 115, to the main cam shaft 93. The main cam shaft 93 is rotated continuously by the motor 95 and accordingly, the shaft 109 is rotated continuously.

There is associated with each of the mandrels 96 a clamp arm 116. The inner end of these arms is of yoke formation having legs 117, 118, journalled on pins 119 carried by the turret, and the legs 118 are formed with arms 120 having rollers 121 at their outer ends, see Figures 5, 6 and 7. The arms 120 are yieldingly urged outwardly from the axis of the turret by compression springs 122. A shoe 124 is pivotally mounted, as at 125, to the outer end of each clamp arm 116, the shoe extending lengthwise of one side of the mandrel. The rollers 121 engage a cam 128 mounted on the upright member 82. This cam 128 is positioned, see Figure 5, so as to be engaged by the rollers 121 just prior to the time the mandrels reach the horizontal position at the carton stripping station, and ride on this cam until the mandrels approach the blank receiving station. This end of the cam however terminates short of the position of the rollers 121 when the mandrels have arrived at the blank receiving station. The arms 120 are depressed however, because the rollers 121 thereupon engage a movable member 130, Figure 14, which forms a continuation of the cam 128 and maintains the arms 120 depressed. The function of the cam 128 and cam extension 130 is to move the arms 120 inwardly toward the axis of the turret, moving the outer ends of the arms 116 and the shoes 124 carried thereby away from the mandrels so that a blank advanced by the chains 107 can be positioned over the top side of the mandrel at the blank receiving station.

Figure 14:
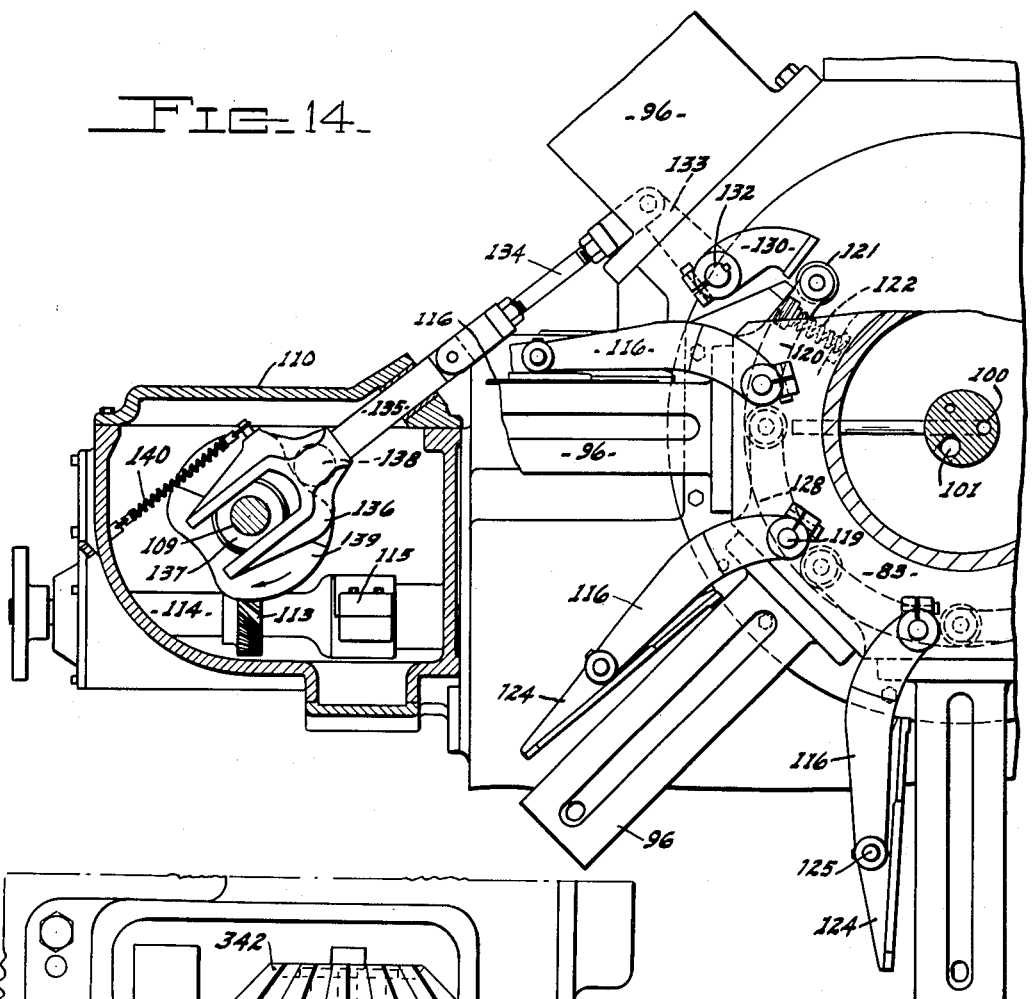
Figure 14 is a view on line 14—14, Figure 4.

When a blank 106 has been positioned over the mandrel, the member 130 is moved in a counter-clockwise direction about its pivot 132, Figure 14, permitting the clamp shoe 124 to press the blank against the mandrel by action of the spring 122. The pivot shaft 132 is journalled in the frame of the machine and has secured to its outer end an arm 133 connected to a link 134 which is connected at its opposite end to a reciprocating rod 135 slidably mounted in the housing 110 and being provided at its lower end with a fork 136 slidable on a guide block 137 on shaft 109. The fork 136 is provided with a roller 138 engaging a cam 139 secured to the shaft 109, the roller being maintained in engagement with the cam by tension spring 140, see Figure 14. The timing arrangement is such that just prior to the indexing of the turret, a low portion of the cam 139 engages the roller 138 whereupon the rods 134, 135, move downwardly, Figure 14, and the cam extension member 130 is moved out of engagement with the roller 121, permitting the clamp shoe 124 to clamp the flat blank against the side of the mandrel.

As the mandrel is indexed one position, the mandrel with the flat blank 106 clamped thereto moves into the blank folding unit shown in Figures 16 to 21 inclusive.

This unit is arranged in a housing 150 mounted on the uprights 81, 82, as by cap screws 151 and extending transversely of the machine. The housing 150 is inclined at an angle of about 45° to correspond to the inclination of the mandrels at this station. The sides of the housing are apertured to permit the mandrels to move therethrough and the leading side of the housing is provided with stationary folding members in the form of wings 152. The wings 152 extend toward the blank receiving station and converge inwardly toward the blank folding station. It will be apparent that if the mandrels are moved to this station, the blanks are positioned approximately centrally thereon, as shown in Figure 21, and a considerable portion of the blank extends laterally from each side of the mandrel, and these laterally extending portions of the blanks are engaged by the wings 152 and folded against opposite sides of the mandrel, see Figure 21. As the mandrel leaves the folding wings 152 and enters the housing 150, the lateral folded portions of the blank are pressed snugly against the sides of the mandrel by blocks 153.

The fourth and fifth panels of the blanks forming the fourth side of the carton are folded about the fourth side of the mandrel. That is, the side opposite to which the blank was initially clamped by the shoes 124. These panels are folded by movable folding members 157, 158, which are moved transversely of the mandrel when it comes to rest in the housing 150. The folding member 157 is formed with a body portion 160 slidably mounted upon rods 161 mounted in the housing 150, see Figure 20. A member 162 is slidably mounted in the upper portion of the housing and is connected at one end to an arm 164 by a link 165. The arm 164 is fixed to a shaft 166 journalled in the housing and provided at its outer end with an arm 167 connected by linkage 168 to a rod 169, the lower end of which is formed with a yoke 170 having a roller 171 operating in a cam track in cam 172 affixed to the main cam shaft 93, see Figures 7 and 16. When the push rod 169 is reciprocated vertically by cam 172, the member 162 is reciprocated transversely in housing 150.

An angle lever is pivoted on a pin 174 in housing 150. One leg 175 of this lever is provided with a roller 176 engaging the member 162, and the opposite leg 177 is provided with a roller 178 engaging the body 160. When the member 162 is moved to the left, see Figure 18, the roller 176 is engaged by a depending portion 179 on member 162 which is formed with a recess 180 to receive the roller 176. This assures movement of the body 160 and the jaw 157 an adequate distance so that the jaw will not be engaged by the moving mandrel. When the member 162 is moved to the right, see Figure 18, the body 160 is moved on the guide pins 161 toward the mandrel, causing the jaw portion 157 to engage the adjacent panel of the blank and fold the same against the fourth side of the mandrel, see Figure 21.

Following this movement of the jaw 157, jaw 158 is moved towards the mandrel folding the last panel of the blank against the mandrel and with the marginal edge portion overlapping the marginal edge portion of the previously folded panel, see Figure 21.

The jaw 158 is pivotally mounted on a body member 182 which is slidably mounted upon pins 183, the jaw 158 being pivotally mounted, as at 185, see Figure 21. There is also pivotally mounted to the body 182 a jaw 186 arranged to function on the same side of the mandrel to which the blank is initially clamped.

The jaw 186 is pivoted at 187 and the opposite ends of the jaws 158, 186, are connected by links 188 to links 189. The links 188 are normally maintained in angular relation by a plunger 190 acted upon by a compression spring 191. The body is reciprocated upon the rods 183 by an arm 192 mounted on a vertically arranged shaft 193. The arm 192 is connected to the link 189. The upper end of shaft 193 has secured to it a gear quadrant 194 arranged in mesh with a rack portion 195 formed on the end of the sliding member 162. The arrangement is such that when the member 162 is moved to the right, Figures 17 and 18, the jaw 157 is moved inwardly towards the center of the mandrel and likewise, the jaws 158, 186. When these latter jaws have been moved inwardly to operative position, the spring 191 becomes compressed and further movement of the link 189 causes the links 188 to move towards straight position, moving the ends of the jaw members apart and moving the mandrel engaging ends of the jaws against the opposite sides of the mandrel.

The purpose of so compressing the jaw 158 against the mandrel is to exert a sealing pressure on the side wall seam of the now formed tubular carton body 198. The surface of the jaw 158 contacting the paper is formed with a plurality of vertically extending ridges 199, Figure 20, which confine the applied force exerted by the jaw to restricted areas on the side wall seam. Accordingly, the pressure applied on these areas is very high effecting a perfect seal and bonding of the overlapping portions of the blank. The purpose of the jaw 186 is to provide a backing up force to relieve the mandrel of any unnecessary strain that might be occasioned by the action of the jaw 158. The clamping shoes 124 are notched out, as at 196, to accommodate the jaw 186.

The link 165 is connected to a rod 200 slidably mounted in a bushing 201 threaded into the end of the member 162. The inner end of the rod is formed with a head portion 202 and a helical compression spring 203 is mounted on the rod and acts between the bushing 201 and the head portion 202. This arrangement is to provide for a slight over-run or movement of the push rod 169 by the cam 172 without exerting undue pressure on the folding jaws 157, 158, 186.

As will be more fully explained hereinafter, the body blanks are coated with a thermoplastic adhesive substance and while the blanks are advanced to the blank receiving station by the conveyor chains 107, they are subjected to heat to properly condition the blanks and render the thermoplastic coating adhesive. The blanks forming the bottom end closures are likewise coated and are heat conditioned before forming and application to the outer ends of the tubular body formation. It is to be understood that this machine operates at relatively high speed, producing from 75 to 100 containers per minute, and the arrangement is such that as soon as the conditioned blank is advanced out of the heating zone and clamped onto the mandrel, the turret is indexed and the blank folded about the mandrel in something less than a second, whereby the blank does not have an opportunity to cool down to any appreciable extent. However, to make certain that the outer end of the tubular body formation does not cool off to any appreciable extent before the bottom end closure is applied, a heater 206 is positioned in the housing 150 in juxtaposition to the outer end of the mandrel when in the blank folding position. This heater is energized by conductors 207, see Figures 17 and 18.

With the tubular body thus formed on the mandrel, the turret 83 is indexed by cam 92 to position the mandrel with the tubular body formation thereon in registration with the forming and applying unit. The bottom closure forming and applying means is contained in a casing positioned on the inner portion of a housing 220 mounted above the turret on the upright pedestals 81, 82.

The forming and applying head consists of a circular member 221 secured to the lower ends of a pair of guide members 222, see Figure 23, slidably mounted for vertical movement in upper and lower bosses 223, 224, formed in the casing 225 mounted on the housing 220. The plate 221 is apertured to receive the shouldered end portions 226 of the guide pins and are secured thereto as by cap screws 227. The member 221 is formed with a central recess to receive a disk member 228, the marginal portion of which is shouldered to provide a recess in which are mounted heating elements 229, and the under side of the disk member 228 is recessed to receive a plug member 230 fixed to the lower ends of guide pins 231 slidably mounted in the member 221. The plug member 230 is normally positioned, as shown in Figure 23, this being effected by a plunger 234 slidably mounted in a stem 235, the lower end of which is fixedly secured in the member 221. The stem 235 is formed with an axial recess in which there is mounted a helical compression spring 236 acting on the top of the plunger 234, and a plug 237 screwed into the end of the stem.

A die plate 240 is detachably mounted on the bottom of the member 221, as by screws 241, and a positioning dowel 242. The screws 241 threaded into the member 221 and the plate is provided with recesses 243 to receive the heads of the cap screws 227, see Figure 28, and with a recess 244 to receive a thermostat 245 clamped in a bracket 246. The die plate 240 is formed with four radially extending slots in which are slidably mounted jaws 247, 248, 249 and 250. These jaws move diagonally of the mandrel. The inner ends of the jaws are formed with a V notch 251 comparable to the corner portion of the mandrel, and the outer ends of the jaws are formed in their upper surface with notches 260 to receive short projections 261 on arms 262. These arms are mounted on pivots 264 in member 221. The upper ends of the arms 262 are provided with rollers 265 engaged by a conical cam member 266. This cam member consists of two sections, each of which is apertured to receive a dowel pin 267 depending from a flange on an actuating member 268. The apertures in the cam member 266 are somewhat larger than the dowel pins 267, whereby the cam sections have a floating movement about the hub portion of the member 268 and on which it is maintained by collar 269 fastened with screws 270.

The actuating member 268 is formed with bosses 272 also slidably mounted upon the pins 222, upward movement being limited by clamp collars 273 fixed to the guides 222. This member is connected to an arm 274 by links 275. The arm 274 is fixed to a shaft 278 journaled in the housing and which has affixed at one end an arm 280, the end of which is attached to a push rod 281, the lower enlarged portion of which is slidably mounted in a sleeve 282 and is restrained from moving upwardly out of the sleeve by cap nut 283. The sleeve 282 is attached to the upper end of a push rod 284, the lower end of which is formed with a fork 285 having a roller 286 movable in a cam track in cam 287 mounted on the main cam shaft 93, see Figures 6 and 7. Upward movement of the sleeve 282 is transmitted to the rod 281 through a compression spring 288.

The stem 235 extends through the lower hub portion of member 268 and a helical compression spring 292 is interposed between the cap 269 and member 221. This spring functions to move the member 221 and the die structure carried thereby downwardly until the collars 273 engage the top of the bosses 272.

The bottom closure blanks are of rectangular form and of dimensions slightly greater than that of the cross section of the mandrels, and the die structure functions to form the marginal portion of these blanks downwardly around the outer end of the tubular body formation on the mandrel, and to compress the flange and seal it to the body. The blanks 300 are arranged in stack formation in a magazine 301 arranged on a casing 302, Figures 39–40, which, in turn, is mounted upon and adjustable lengthwise of the casing 304 supported on the housing 220. Casing 302 is provided with three elongated slots 290 receiving screws 291 threading into the casing 304, this arrangement providing the lengthwise adjustment of the casing 302.

The blanks 300 are withdrawn successively from the magazine 301 by a suction cup 305 mounted for reciprocation toward and from the magazine. The suction cup is secured to the upper end of a stem 306 slidably mounted in a bracket 307. The cup is moved upwardly into engagement with the lowermost blank in the magazine, vacuum is applied to the cup through an axial passage in the stem, the lower end of which is connected to a hose 308 running to a source of vacuum. The stem 306 is reciprocated between a pair of chains 310 trained over sprockets 311, 312, journalled in the housing 304. The chains 310 carry a series of blank carriers 314. Each carrier is provided with spaced apart confronting members 315 into which the blanks 300 are deposited as the suction cup 305 moves downwardly between these members, see Figure 39.

The chains 310 are moved intermittently. When the chains dwell, a cap carrier 314 is positioned in registration below the magazine 301. The sprocket 312 is secured to a hub member 316, Fig. 40, fixed to the inner end of a shaft 317. A gear 318 is secured to the outer end of the shaft and arranged in mesh with a gear 319 journalled in the casing and which, in turn, meshes with a gear 320. The gear 320 has affixed to it a Geneva wheel 321 which is indexed by a crank pin 322 secured to a shaft 324 journalled transversely in the housing 304. A miter gear 325 is fixed to the outer end of the shaft 324 and engages a mating gear 326 secured to the upper end of a shaft 327. The lower end of the shaft 327 is journalled in a gear box 330, Figure 8, mounted on the side member 81. The lower end of the shaft 327 is provided with a gear 331 arranged in mesh with a gear 332 mounted on a shaft 334, the opposite end of which is journalled in a gear box 335. The shaft 334 is enclosed by a tubular guard 336. The shaft 334 is connected to a shaft 338 through miter gears 339, 340. The shaft 338 is connected to the main cam shaft 93, or an extension 341 thereof, through miter gears 342, 344. With this arrangement the shaft 324, Figure 40, rotates continuously and the Geneva wheel 321 is effective to cause intermittent movement of the conveyor chains 310.

The suction cup stem 306 is reciprocated toward and from the magazine by a link 345, one end of which is pivotally connected to an arm 346, and the outer end to a valve mechanism 350. The upper end of the arm 346 is pivoted in the casing, as at 347, and the arm is provided with a roller 348 intermediate its ends engaging a cam 349 mounted upon the shaft 324. Vacuum is applied to the suction cup when it is moved into engagement with the lowermost blank in the magazine 301 and the vacuum is released when the blank is deposited in the grippers 315. The valve mechanism 350 is carried by the stem 306. When the cam 349 has effected downward movement of the stem and the suction cup 305 to position the blank 300 in the holders 315, the valve engages a screw 359 fixedly mounted in the bracket 307, moving the valve to open position whereupon the suction cup is connected to atmosphere and the vacuum released. When the stem 306 is moved upwardly toward the magazine, the valve moves out of engagement with the screw 359 whereby vacuum is applied to the suction cup.

The sprockets 312 are moved in a counter-clockwise direction, Figure 39, whereby the blanks are carried along the upper run of the chain through a casing 351 in which there are mounted heating elements 617, Figure 43, to properly condition the blanks. After the blanks pass around the sprockets 312, they are removed from the blank carriers 314 by a blank transfer member 352 mounted on a carriage 353 slidably mounted in ways 354. The heated blanks are frictionally held by the members 315 and as the transfer member 352 moves transversely of the conveyor chain, the conditioned blanks are pushed through a throat aperture 355 and into blank retaining members 356, 357, 358, secured to the under side of the die plate 240, see Figures 6, 7, 29 and 30.

Wedge shaped members 360 are secured to the under surface of the die plate between the central rectangular aperture 361 in the die plate and the throat member 355. The confronting edges of the blank retaining members 356, 357, 358, are inclined as at 363. These members serve to guide and centrally position the flat blank below the aperture 361 and to hold the blank against the bottom of the die plate.

Due to the fact that the blank engaging members 315 on the carriers 314 are spaced apart so as to frictionally engage opposite edges of the blanks, the blanks have a slight tendency to assume an arcuate formation, especially after they have passed through the heater. The side edges of the blank formerly engaged by the members 315 are guided by the pieces 356, 358. The leading side edge of the blank engages the beveled or notched formation of the piece 357, the confronting surface of which is also inclined downwardly from each of the pieces 356, 358, as indicated at 365, Figures 30 and 33. This inclination will accommodate any arcuate formation in the blank.

The function of the wedge pieces 360 is to admit the blank 300 now curved as blank indicated by dotted outline 366, Figure 32, the thickness of the wedges being somewhat greater than any curvature contained in the blank whereby, after the blank has been positioned against the piece 357, it will spring upwardly toward flat condition and the wedge pieces 360 will assure that it will not be moved rearwardly upon rearward movement of the transfer member 352.

With the heated blank thus positioned on the under side of the die plate, the cam 287 effects downward movement of the arm 274, as previously explained. This effects downward movement of the forming and sealing structure, positioning the blank against the end of the mandrel and clamping it there with the plug member 230.

As the die structure moves downwardly, the plug actuating plunger 234 moves upwardly against compression spring 236. The die plate 240 moves downwardly into engagement with the marginal portion of the blank, holding it about the top portion of the tubular container body 198. This downward movement continues until the collar stops 370 engage the bosses 223, this movement being sufficient to bring the confronting V faces of the jaws 247, 248, 249, 250, in registration with the flange of the bottom closure. Further downward movement of the actuating member 268 against the compression spring 292 moves the cam sections 266 into engagement with the rollers 265 causing the arms 262 to spread outward against the action of tension springs 372 and causing the projections 261 to move the jaws inwardly and exert a sealing pressure on the flange of the bottom closure.

At the initial part of the downward movement of the forming and sealing unit, opposite sides of the tubular formation are clamped against the mandrel by shoes 374, Figures 6 and 7. The clamps 374 are mounted on plungers 375 slidably mounted in brackets 376 extending inwardly from the side members 81, 82. The clamps are urged inwardly toward the mandrels by helical compression springs 377. The outer ends of the plungers are provided with head portions 378 arranged to be engaged by bifurcated members 380 fixed on shafts 381, see Figure 6. Like ends of the shafts 381 are provided with arms 382, the ends of which are apertured to receive rods 383 which extend upwardly through the housing 220 and the casing 225. The upper ends of the rods are connected to a cross member 384. The shaft 278 has keyed to it an offset arm 385, Figure 22, extending under the cross member 384. This arrangement is such that when the head unit is elevated, including the arm 385, the rods 383 are moved upwardly effecting engagement of the bifurcated portions of the members 380 against the head portions 378 of the plungers 375, moving them outwardly against the springs 377 and moving the shoes 374 away from the mandrel. Upon the initial downward movement of the arms 274, 385, Figure 22, the rods 383 are moved downwardly, permitting the plungers 375 to move inwardly and cause the shoes 374 to engage the side walls of the tubular container body and press the same against the mandrel. The reason for this structure is that when the blank has been folded about the square mandrel and sealed at the side wall seam, the panel portions of the blank, or the flat sides of the tubular body, have a tendency to bow out away from the mandrel slightly and the function of the shoes 374 is to compress the upper portion of the tubular body flat against the opposite sides of the mandrel. It will be observed that the leading side of the tubular formation is already compressed against the mandrel by the blank clamping shoe 124.

Means is provided for limiting the inward movement of the shoes 374 to prevent them from engaging the sides of the mandrel in the event no tubular formation should be present on a mandrel. The members 380 have depending arms 388 in which are mounted adjustable stop screws 389 which are so adjusted that they engage fixed stops 390 when the shoes 374 move inwardly with no tubular formation on the mandrel, this adjustment being such that the shoes do not touch the mandrel.

Means is also provided for moving the fourth side of the tubular body against the mandrel, that is the side opposite the clamp 124. The bottom closure blank guide and positioning member 356 is provided with an inwardly extending projection 392. The inner end of this member is inclined, or chamfered, as at 393, and serves, when the die plate 240 is moved downwardly over the end of the tubular formation, to guide and press that side of the carton body against the mandrel.

With this arrangement, all four sides of the carton body are maintained snug against the sides of the mandrel. This lends for better and more precise formation of the bottom closure flange and better sealing thereof to the carton body.

The marginal portion on the under side of the die plate 240 about the opening 361 is inclined, as at 395, Figures 31 and 33, this surface being widest at the center of the sides of the opening 361 and tapering, as at 396, toward the corners of the opening. The die plate is formed with arcuate upwardly inclined grooves 397 at each corner of the die opening. With this arrangement, those portions forming the corners of the bottom closure flanges are folded downwardly in advance of the center portions of the flanges and the excess material at the corners of the flanges are gathered uniformly by the inclined arcuate grooves 397.

In the enlarged view, Figure 37, it will be observed that the corner edges of the mandrels 96 are rounded, as at 398, and that the corners of the V notches of the jaws 247—250 are rounded as at 399, the radii 399 in the jaws being considerably less than the radii 398 on the mandrel corners.

As previously explained, when the forming die has moved down over the end of the mandrel and the tubular body formation thereon, the sealing jaws are moved in under high pressure by the arms 262. Inasmuch as the excess material in the corners of the bottom closure flange has been evenly accumulated in a fold, the diagonally inward movement of the jaws compacts this excess material into a uniform mass, as at 400, and while this corner portion of the flange is of somewhat greater thickness than the remainder of the flange, nevertheless, because of the large amount of excess material present as the jaws move inwardly, this material is compacted very tightly against the corner portion of the tubular body 198 into a relatively rigid corner rib for accumulation.

Inasmuch as the tubular body formation 198 is formed with a side wall seam, see Figure 38, there would normally exist an opening between the body formation and the flange 401 of the bottom closure at the edge of the outer lap 402 and which would result in a leak. This situation is remedied by the formation on the overlapping portions of the jaws 249, 250, which engage this portion of the bottom flange. Opposite ones of the jaws, such as 247, 249, Figures 28–34–36, are formed with grooves 404 to receive tongues 405 formed on the opposite jaws 248, 250.

It will be apparent that this tongue and groove formation is located at the central portion of each flat side of the container. The inner face of the jaws contacting the bottom closure flange is milled out, or recessed, as at 406 to form a plurality of ridges 407. This reduces the area of the jaw faces in contact with the bottom closure flange and with a given pressure effected by movement of the arms 262, effects at confined areas a greater pressure on the closure flange.

The tongue 405 of the jaw 250 positioned at the side wall seam of the carton is formed with a projection 408 positioned so as to exert additional pressure and crowd the flange 401 against the container body 198 at the edge of the outer lap 402, see Figure 38. This crowding of the material at this point substantially eliminates any passage or interstice at the edge of this overlap, the edge portion of the overlap being itself ironed down, or reduced in thickness, and merged with the carton body and the closure flange. This action takes place midway in the width of the flange inasmuch as the tongue 405 is so positioned. The adjacent surfaces of the bifurcated portion of the jaw 249 are provided with projections 410 located immediately above and below the projection 408, and effect a similar compression action, as illustrated in Figure 37. Both jaws have relieved portions 411 to accommodate the extra thickness of the paper resulting from the overlap or side wall seam.

With this arrangement, excessive pressure is not developed because of the extra thickness of paper at the side wall seam, but additional pressure is applied in confined areas to close off any opening or passage that would normally exist at the edge of the outer overlap.

It will be understood that all of the moving mechanism in the machine are operated in timed relation. The bottom closure blank transfer 352 is moved inwardly during the dwell period of the chains 310 to move the blank home in the die structure before the same starts its downward movement. This transfer is actuated by an arm 415, Figures 39, 40, the arm being pivoted to the under side of the casing 304, as at 416, and has an extension 417 carrying a roller 418 at its outer end engaging a cam 419. The opposite end of the lever 415 is connected to a link 420, the opposite end of which is pivotally connected to the carriage 353. The cam 419 is fixedly secured on the shaft 327.

The bottom closure blank conditioning unit shown in Figures 39 and 40 per se, forms no part of this invention, the same being disclosed and claimed in the copending application of Wilcox et al., Ser. No. 25,944, now Patent No. 2,692,463, issued October 26, 1954.

Figure 41:
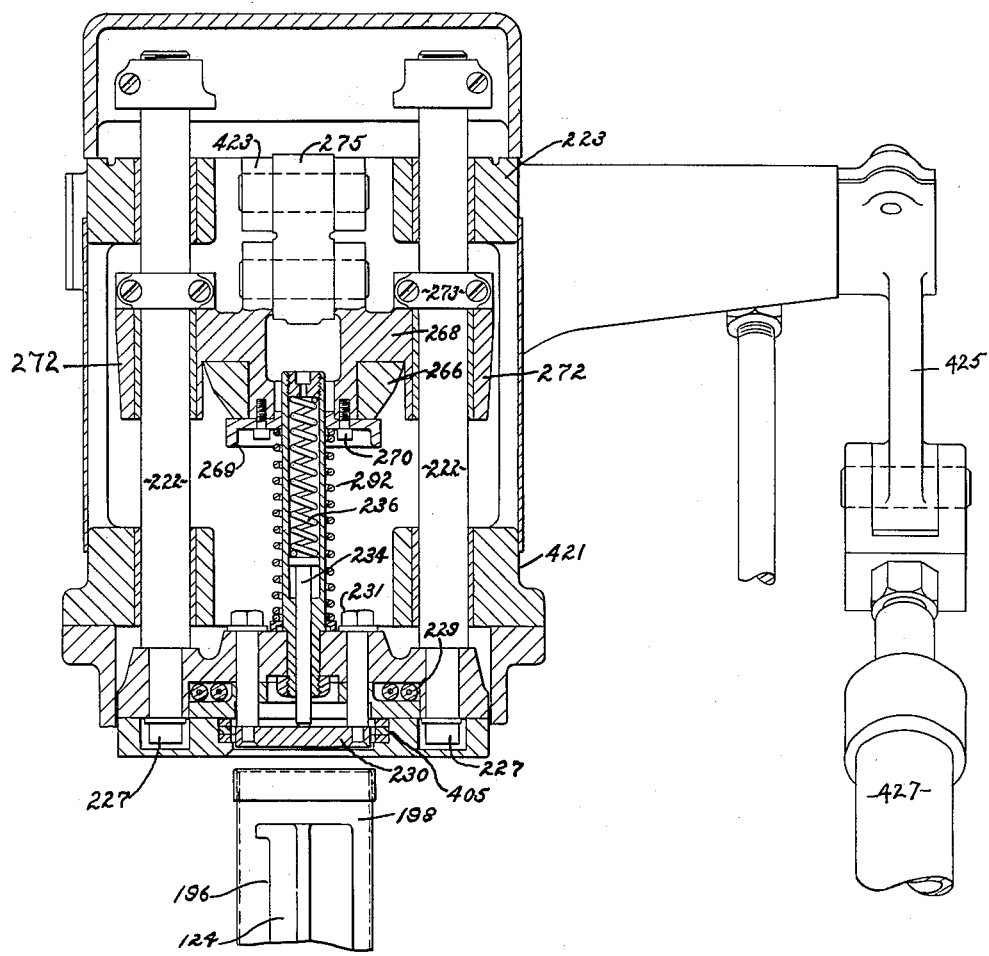
Figure 41 is a view similar to Figure 23 of the second sealing head.
Figure 42:
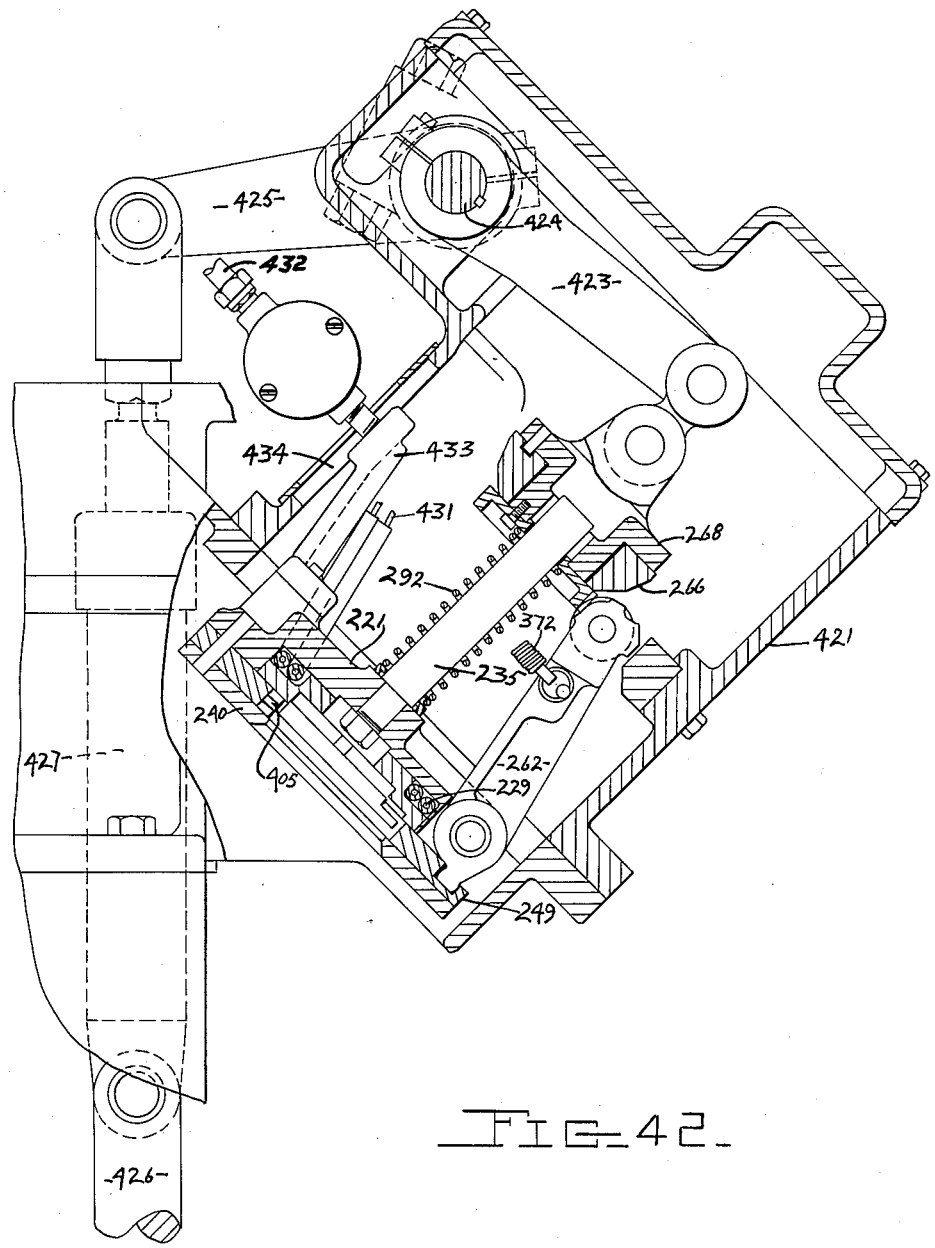
Figure 42 is a view similar to Figure 25 of the second sealing head.

The mandrels are indexed from the vertical position below the bottom closure forming and applying head to a second sealing station. This second sealing mechanism is mounted in a housing 421 mounted on the housing 220. Essentially, this sealing mechanism is the same construction as the forming and sealing head in housing 225. It is disclosed in Figures 41 and 42 of the drawings and the same reference numerals are applied to corresponding parts. The chief difference in the construction of these two heads is that the second sealing head arranged in the housing 421, the blank guiding positioning and retaining members 356, 357, 358, are omitted in view of the fact that the end closure has already been formed and sealed to the end of the carton body. The function of this second head is to make certain that the flange of the bottom closure is adequately sealed throughout its entire surface to the carton body, especially where the carton is going to be used for packaging milk or material containing an oily substance that would be likely to seep through any minute interstice resulting from any small area not being properly sealed.

The die structure is actuated vertically by an arm 423 fixed to a shaft 424 journalled in the housing and which has affixed to its outer end an arm 425 connected to a push rod 426 by spring compensated linkage mounted within the tubular member 427, this structure being identical with that shown in Figure 6 and described in detail in connection with the first forming and sealing head. The push rod 426 is formed with a yoke 428, Figure 7, having a roller 429 positioned in a cam track in a cam 430 also mounted on the main cam shaft 93.

In both sealing heads, current is supplied to the heating elements 229 by conductors 431 which are brought into the heads through conduits 432 mounted on brackets 433 secured to the body members 221, the conduits being movable vertically with the body through an aperture 434 formed in the side wall of the housings 225, 421.

The mandrels are indexed from the second sealing head to the carton stripping station. In this position, the mandrels are located horizontal and opposite to the carton blank receiving station. At this station, the carton 198, with the bottom closure sealed to the outer end thereof, is stripped from the mandrel.

A pair of guide rails 500 are mounted on the frame of the machine and extend in spaced apart parallel relation on opposite sides of the mandrel, see Figures 9 and 10. The upper and lower edges of the guide rails 500 are formed with V ways to receive rollers 501 on carriages 502, the carriages being located between the rails 500 and the mandrel. Each carriage has adjustably affixed to it a block 504, as by screws 505. The blocks 504 are formed with ribs 511 on their surfaces confronting the carriages 502. These ribs are slidably mounted in grooves formed in the carriages to permit adjustment of the blocks in a direction lengthwise of the carriages, the blocks being clamped in adjusted position by the screws 505. These blocks are provided at one end with inwardly extending projections 506 between which carton engaging members 508 are mounted on pivot pins 509. The members 508 are formed at their free ends with hook portions 510 arranged to engage the inner end of the side wall of the carton 198. The members 508 are yieldingly urged toward the mandrels by helical compression springs 512, the inward movement being limited by stop screws 513.

When the mandrels 96 are indexed to the stripping position, the carriages 502 are positioned inwardly with the members 508 in proximity to the turret. When the mandrels come to rest, the carriages move outwardly, whereupon the hook portions 510 engage the inner edge at the open end of the carton and move it axially off from the mandrels. To facilitate this operation, the opposite side walls of the mandrel are formed with lengthwise extending recesses 514, the outer ends of which communicate with passages 515 extending through the end wall of the mandrel. This prevents the formation of a vacuum when the carton is stripped from the mandrel.

The carriages 502 are reciprocated upon the guide rails 500 by arms 518 connected at their upper ends to the carriages by links 519, Figure 5. The arms 518 are fixed to a shaft 520 journalled in the frame below the mandrels at the stripping station. The shaft 520 has affixed to it an arm 521 connected to a member 522, see Figure 8. The member 522 has a roller 523 arranged in a cam track formed in cam 524 mounted on shaft 525 journalled in the housing and which has affixed to it a gear 526. This gear is arranged in mesh with a gear 527 fixed on the shaft 338. The timing and formation of the cam is such that instantly when the mandrel comes to rest at the carton stripping station, the carriage is quickly moved forwardly to strip the carton from the mandrel and returned to initial position ready to strip the carton from the next succeeding mandrel.

As will be apparent, the completed cartons are stripped from the mandrel in horizontal position and this stripping operation places the carton between a pair of carton gripping members 528, each pair being mounted upon an arm 529 affixed to a shaft 530. The shaft 530 is in the form of a tube or sleeve rotatable upon the shaft 338, see Figure 8. One end of this tubular shaft 530 has affixed to it a gear 531 arranged in mesh with a gear 532. The gear 532 has associated with it a Geneva wheel 534 which is intermittently actuated step by step by a roller 536 mounted on a crank member 537 secured to the shaft 338, Figure 45. This timing is such that as soon as a carton is stripped from the mandrel and inserted between a pair of the blades 528, the shaft 530 is rotated 90°, which effects an up-ending of the carton.

The cartons are transferred from the up-ending device alternately to the right and the left, Figure 12. A guide rail 540 extends transversely of the machine to support a carriage 541 of a construction similar to the carriages 502. This carriage has depending from it a transfer member having a pair of spaced apart blades 542, 543. In Figure 12, the carton is indicated by dotted outline 198, and the carriage 541 is positioned at the right end of the guide rail 540. With this situation, the carriage 541 is moved to the left whereupon the container, or carton, is engaged by the blade 542 and moved from the up-ending device to a carton guide rail 546. The carriage 541 remains in the last position until the next succeeding carton has been up-ended by the up-ending device, whereupon the carriage 541 is moved to the right, the blade 543 engaging the carton moving it to the right onto the guide rail 547. There are a pair of these guide rails extending from the machine, and the containers are intermittently advanced along the rails 546, 547, by container advancing means operated in timed relation.

The means for advancing the containers along the guide rails 546, 547, the container filling apparatus, and the top closure forming and applying mechanism are specifically disclosed in the copending application, Ser. No. 25,944, filed May 8, 1948, above referred to.

Figure 15:
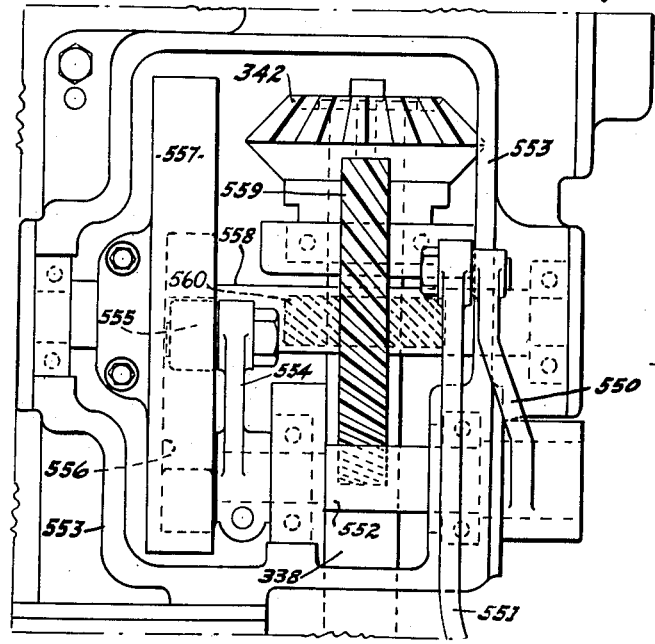
Figure 15 is a view of the drive mechanism for the carton transfer.

The carriage 541 is moved transversely of the machine on the guide rail 540 by an arm 550 which is connected at its upper end to the carriage by a link 551, see Figure 3. The lower end of the arm 550 is secured to a shaft 552 journalled in a housing 553. An arm 554 is secured to the shaft and at its free end is provided with a roller 555 arranged in a cam track 556 formed in a cam 557 mounted on a shaft 558, see Figure 15. The shaft 558 is journalled parallel to the shaft 552 above and at right angles to the shaft 338 and is provided with a helical gear 559 arranged in mesh with a similar gear 560 mounted on the shaft 338.

With this arrangement, the cam 557 is rotated, oscillating the arm 554, the shaft 552 and the arm 550 to move the carriage 551 in timed relation to the rest of the machine.

A body blank feeding and conditioning unit suitable for supplying the machine with conditioned body blanks is shown generally in Figures 43 and 44. This unit consists of a base 600 supported on feet 601 and attached to the left end of the base 80, Figures 1 and 5. A casing 602 in the form of a casting is mounted on one end of the base 600, and a pedestal member 603 is mounted upon the base 600 adjacent to the turret section of the machine. A shaft 604 is journalled transversely in the casing 602 and carries sprockets 605 over which the chains 107 are trained. The lower run of the chain is trained over idler sprockets 606 and 607. The blanks are arranged in stack formation within the guide rods 608, 609, 610, extending upwardly from the top of the casing 602.

Blank feeding mechanism is mounted within the casing 602 and is driven in timed relation by shaft 612 connected to the end shaft 613 of shaft 114 extending from the gear casing 110 and which is operatively connected to the main cam shaft 93, as previously explained, whereby the blank feeding mechanism is operated in timed relation to the movement of the turret 85. The blank feeding mechanism is operable to successively feed blanks 106 from the stack contained within the guide rods 608, 610, and deposit the same on the upper run of the conveyor chain 107, this chain being provided with spaced supporting lugs 615 and blank positioning lugs 616. The blanks 106 are subjected to heat from heaters 617 while being advanced by the conveyor chain 107. The blank feeding mechanism per se forms no part of this invention and may be of any conventional blank feed arrangement.

The specific structure of the blank feeding and conditioning mechanism forms no part of this invention.

As previously stated, the machine will accommodate body blanks of various lengths to form tubular bodies of various lengths for containers of various capacities. The blanks 106 are always positioned on the mandrels 96 at the blank receiving station, Figure 5, with the rear edge of the blank flush, or substantially even, with the outer end of the mandrel. To assure this position, regardless of the length of the blank, stop members 620, 621, 622 are mounted on studs 623, see Figure 13, which are threaded into the upright side members 81, 82. These stop members are formed with hub portions apertured to permit the stop members to be rotated on the studs into and out of horizontal blank engaging position, and the stop members are yieldingly pressed towards the frame members 81, 82, by helical compression springs 624 acting between the outer stop members 620 and nuts 625 threaded on the outer ends of the studs.

In Figure 13, the larger size blank 106 is illustrated in dotted line and as being positioned against the inner stop 622, in which event the stop members 620, 621, would be turned upwardly to permit the leading edge of the blank to clear these members and to seat against the inner members 622 with the rear edge of the blank even with the outer end of the mandrel 96.

In order to make certain that the blank is properly positioned in respect to the mandrel before the clamp 124 is moved into engagement with the blank, the last movement of the blank is effected by a pair of arms 630. These arms are fixedly secured to a shaft 631 journalled in brackets 632 fixed to a shaft 633. The shaft 633 is journalled in brackets 634 secured to the uprights 81, 82 and which extend forwardly and upwardly, see Figure 5.

The shaft 631 is oscillated in the brackets 632 by a cam 635 fixed to the shaft 109, see Figure 7. The shaft 631 has affixed thereto an arm 636 connected by a link 637 to a push rod 638 provided with a roller 639 riding on the cam 635. The push rod is urged downwardly by helical tension spring 640.

The shaft 633 is also oscillated by a cam 641 mounted adjacent the cam 635 in the housing 111. The shaft 633 has affixed to one end an arm 642 connected by link 643 to a push rod 644 having a roller 645 riding on the cam 641, the push rod being urged downwardly by spring 646.

The arrangement of the cams 635, 641, and the linkage is such that the lower ends of the arms 630 move upwardly and outwardly away from the mandrel and over the next incoming blank on the conveyor chains 107, descend behind the rear edge of the blank, and then move forwardly moving the blank against the selected stop members 620, 621, 622. Oscillation of the shaft 631 effects movement of the lower ends of the arms toward and from the mandrel. Oscillation of the shaft 633 raises and lowers the arms, these functions being timed to effect the operation just described.

The forward movement of the arms 630 is such as to position the blank against the stop member and with the rear edge of the blank even with the outer end of the mandrel. The arms stay in this position until the clamp 124 descends on the blank. The blanks are guided from the conveyor chains over the mandrel by a heated plate 650 slotted to receive the conveyor chains and the lower ends of the arms 630, and bifurcated to form portions 651 on opposite sides of the mandrels.

With this arrangement, the blanks are accurately positioned on the mandrels regardless of the length of the blanks being run, and the blank is fixedly clamped to the mandrel in this position and is held in this position until the completed carton is ready to be stripped from the mandrel at the carton stripping station. This aids materially in effecting a perfect liquid tight seal upon the application of the bottom closure in the manner hereinbefore set forth.

What we claim is:

1. Apparatus for forming cartons of sheet fibrous material comprising a suitable frame, a turret journalled for rotation in said frame and being provided with a plurality of radially extending mandrels rectangular in cross section, means for supporting a supply of flat carton blanks, a blank feeder operable to feed said blanks from said supply and position the same successively on said mandrels, a clamp member arranged in juxtaposition to each mandrel and operable to clamp the blanks against the first side of the mandrels with the major portion of the blank extending laterally from opposite sides of the mandrels, stationary folding members cooperable upon rotation of the turret to fold the lateral portions of the blanks against said opposite sides of the mandrels, a second pair of folding members mounted in the frame for movement transversely of the mandrels and being cooperable upon such movement to fold the remaining portions of the blanks against the fourth side of the mandrels with the edges in overlapping relation to form a tubular body member, and one of said second folding members being operable to exert a pressure on said overlapping portions, a mandrel supporting member mounted in the frame for movement transversely of the mandrels and being operable upon such movement to engage the first side of the mandrel during the exertion of pressure by said second folding member, an end closure applying head operable to apply an end closure to the outer end of each tubular body formed on the mandrel to form a carton, means for removing the cartons from the mandrels, and motion transmitting means operable to effect intermittent rotation of said turret, movable folding members, mandrel support, and carton removing means, in timed relation.

2. Apparatus for forming cartons of sheet fibrous material comprising a suitable frame, a turret journalled for rotation in said frame and being provided with a plurality of radially extending mandrels rectangular in cross section, means for supporting a supply of flat carton body blanks in stack formation, a blank feeder operable to feed said blanks from said supply and position the same successively on said mandrels, a clamp member carried by each mandrel and operable to clamp the blanks against a first side of the mandrel with the major portion of the blank extending laterally from opposite sides of the mandrel, motion transmitting means operable to effect intermittent rotation of the turret, stationary folding members cooperable upon rotation of the turret to fold the lateral portions of the blanks against opposite sides of the mandrels, a second pair of folding members mounted in the frame for movement transversely of the mandrels and being cooperable upon such movement to fold the remaining portion of the blank against the fourth side of the mandrels, a mandrel supporting member mounted in the frame for movement transversely of the mandrels and being operable upon such movement to engage the first side of the mandrel during the folding movement of said second folding members, an end closure applying head operable to apply an end closure to the outer end of each body, and means for removing the cartons from the mandrels.

3. Apparatus for forming cartons of sheet fibrous material comprising a suitable frame, a turret journalled in the frame and being provided with a plurality of radially extending mandrels, means operable to form a tubular carton body on each mandrel from a flat blank of sheet material, actuating means operable to effect intermittent rotation of said turret to successively position the mandrels at a carton discharge station, carriages mounted in the frame on opposite sides of the mandrels positioned at said carton discharge station, actuating means for moving said carriages toward and from the axis of the turret, a carton engaging member mounted on each of said carriages for movement toward and from the confronting sides of the mandrels, means yieldingly urging said carton engaging members inwardly toward the mandrels, and stop means cooperable to limit such inward movement toward the mandrels and position said members spaced from the mandrels for engagement with the inner end edge of the cartons positioned on the mandrels and being operable upon movement of said carriages outwardly from the axis of the turret to strip the cartons from said mandrels.

4. A machine for forming cartons of sheet fibrous material comprising a suitable frame, a turret journalled in the frame on a horizontal axis and being provided with a plurality of mandrels extending radially from the axis of the turret, body forming mechanism operable to form a tubular carton body on each mandrel, an end closure forming and applying mechanism operable to form and apply an end closure to the outer end portion of each carton body, actuating mechanism for intermittently rotating the turret to move said mandrels from said body forming mechanism to said end closure applying mechanism and thence to a carton discharge station, a carriage arranged on each side of the mandrel at said carton discharge station and being movable toward and from the axis of the turret, a carton engaging member pivotally mounted on each of said carriages for movement toward and from the confronting sides of the mandrels, means yieldingly urging said carton engaging members inwardly toward the mandrels, and stop means cooperable to limit such inward movement and position said members spaced from the mandrels for engagement with the inner end edge of the cartons on the mandrels, and being operable upon movement of said carriages radially outwardly from the turret to strip the carton from the mandrels, and actuating mechanism to move said carriages outwardly and return the same inwardly during the dwell of said turret.

5. Apparatus for forming cartons of sheet material comprising a suitable frame, a turret journalled for rotation in the frame and being provided with a series of mandrels rectangular in cross section, means operable to intermittently effect rotation of said turret to move said mandrels successively to a body blank receiving station, a body blank folding station, an end closure applying station, and a carton discharge station, body blank feeding means operable to position a flat body blank on each mandrel at said blank receiving station, a clamp operable to clamp the blank against the first side of the mandrel, a housing carried by the frame at said body blank folding station and having an opening to permit passage of the mandrels therethrough upon rotation of the turret, a pair of folding members fixedly mounted on the housing externally thereof and being cooperable during movement of the mandrels into said passage to fold the lateral portions of the blanks against opposite sides of the mandrels, a second pair of folding members slidably mounted in said housing for movement transversely of the mandrels and operable upon such movement to fold the remaining portions of the blanks against the fourth side of the mandrels with the edges in overlapping relation to form the blanks into tubular body members, one of said movable folding members being operable to exert a pressure on said overlapping portions, a mandrel supporting member mounted in said housing, motion transmitting mechanism operable to move said second folding members laterally on the fourth side of the mandrels, and simultaneously move said mandrel supporting member into engagement with the first side of the mandrels, an end closure forming and applying head at said end closure applying station operable to form and apply an end closure to the outer end of each tubular body formed on the mandrels to form a carton, and means for removing the formed cartons from the mandrels at said carton discharge station.

6. A carton forming machine comprising a turret provided with a circular series of mandrels, means operable for forming cartons on said mandrels, actuating means for intermittently rotating said turret about a horizontal axis to move the mandrels successively to a horizontal position at a carton discharge station, a carton up-ending device arranged in juxtaposition to said station and including a series of carton receiving members movable about an axis extending parallel to the axis of the turret from a horizontal position in registration with the mandrels at said station to a vertical position, carton stripping mechanism arranged at said station and being operable to strip the cartons from the mandrels and deposit the same in said carton receiving members, said up-ending mechanism being operable in timed relation to the indexing of the turret to move said carton receiving members into vertical position, and a carton transfer member movable in a direction transversely of said mandrels and operable to automatically transfer the cartons from said carton receiving members positioned vertically in alternate directions transversely of the plane in which said mandrels are rotated.

7. Apparatus for forming cartons of sheet fibrous material comprising means for intermittently advancing a procession of mandrels rectangular in cross section along a path successively to a blank receiving station, a blank folding station, an end closure applying station and a carton discharge station, a body blank conveyor operable to advance a procession of flat body blanks and deliver the same successively to mandrels positioned at said blank receiving station, a clamp associated with each mandrel and operable to clamp the blank against one side of the mandrels with the major portion of the blanks extending laterally from opposite sides of the mandrels, stationary folding members cooperable upon movement of the mandrels toward said folding station to fold the lateral portions of the blanks against opposite sides of the mandrels, a pair of body members slidably mounted in the frame on opposite sides of the path traveled by said mandrels, a folding member fixedly secured to one of said body members, a folding member movably mounted on said other body member, said folding members being cooperable upon movement of said body members toward the mandrels to engage and fold the remaining portions of the blank against the fourth side of the mandrels with the edges of the blank in overlapping relation to form a tubular body member, a mandrel support movably mounted on said other body member and adapted to overlie the first side of the mandrels upon such movement of said other body member toward the mandrels, motion transmitting means operable to successively move said body members toward the mandrels and move said movable folding member and said mandrel support into engagement with said tubular body on the fourth and first sides of the mandrel respectively, an end closure applying head at said end closure applying station to apply an end closure to the outer end of each tubular body to form a carton, and means at said discharge station for removing the cartons from the mandrels.

8. Apparatus for forming cartons of sheet fibrous material comprising means for intermittently advancing a procession of mandrels rectangular in cross section along a path successively to a blank receiving station, a blank folding station, an end closure applying station and a carton discharge station, a body blank conveyor operable to advance a procession of flat body blanks and deliver the same successively to mandrels positioned at said blank receiving station, a clamp associated with each mandrel and operable to clamp the blank against one side of the mandrels with the major portion of the blanks extending laterally from opposite sides of the mandrels, a housing detachably mounted on the frame at said folding station and being formed with a passageway in registration with the path along which the mandrels are moved to permit the same to move therethrough, a body member slidably mounted in said housing at each side of said passageway for movement toward and from the same, a folding member fixedly secured to one of said body members, a folding member movably mounted on said other body member, said folding members being cooperable upon movement of said body members toward said passageway to engage and fold the remaining portions of the blank against the fourth side of the mandrels positioned in said passageway and with the edges of the blanks in overlapping relation to form a tubular body member, a mandrel support movably mounted on said other body member and adapted to overlie the first side of the mandrels upon such movement of said other body member toward the passageway, motion transmitting means operable to successively move said body members toward said passageway and move said movable folding member and mandrel support into engagement with the tubular bodies on the mandrels, an end closure applying head at said end closure applying station operable to apply an end closure to the outer end of the tubular body on said mandrel as the same is positioned at said station, and means at said discharge station for removing the cartons from the mandrels.

9. Apparatus for forming cartons of sheet fibrous material comprising a frame, a turret journalled in the frame on a horizontal axis and being provided with a plurality of radially extending mandrels, actuating mechanism for intermittenty rotating the turret to move said mandrels from a body blank receiving station to a folding station, and end closure applying station and thence to a carton discharge station, said mandrels being positioned horizontally at said blank receiving station and said carton discharge station, conveyor mechanism operable to advance a procession of flat body blanks toward the turret, a series of stop members mounted on the frame at said blank receiving station in juxtaposition to a mandrel positioned at said station, said stop members being individually movable into blank engaging position, a blank positioning means movable in a direction axially of the mandrels and operable to transfer said blanks successively from said conveyor against a stop member moved into blank engaging position and in juxtaposition with the mandrels as the same are positioned at said blank receiving station, carton body forming mechanism at said folding station operable to fold the blanks about the mandrels and sealing the same to form a tubular body, end closure applying mechanism at said end closure applying station operable to form and apply a separate flanged end closure to the outer end of each tubular body, a carton up-ending means arranged to receive cartons stripped from said mandrels and move the same to vertical position with the open end upwardly, and carton stripping means located at said carton discharge station and operable to strip the cartons from each mandrel as the same arrive at said station and insert the stripped cartons into said up-ending device.

References Cited in the file of this patent

UNITED STATES PATENTS

| Number | Name | Date |
|---|---|---|
| 170,039 | Williams | Nov. 16, 1875 |
| 988,051 | Vallarino | Mar. 28, 1911 |
| 1,433,251 | Annen | Oct. 24, 1922 |
| 1,444,096 | Beadle | Feb. 6, 1923 |
| 1,875,986 | Bronander | Sept. 6, 1932 |
| 1,916,425 | Howard | July 4, 1933 |
| 2,049,419 | Barbieri | Aug. 4, 1936 |
| 2,121,135 | Vergobbi | June 21, 1938 |
| 2,125,414 | Baker | Aug. 2, 1938 |
| 2,168,191 | Bergmann | Aug. 1, 1939 |
| 2,168,543 | Vergobbi | Aug. 8, 1939 |
| 2,212,472 | Hartmann | Aug. 20, 1940 |
| 2,262,612 | Kopitke | Nov. 11, 1941 |
| 2,264,330 | Pelosi | Dec. 2, 1941 |
| 2,266,948 | Barbieri | Dec. 23, 1941 |
| 2,268,283 | Harris et al. | Dec. 30, 1941 |
| 2,287,817 | Murch | June 30, 1942 |
| 2,330,466 | Bergstein | Sept. 28, 1943 |
| 2,367,884 | Monroe | Jan. 23, 1945 |
| 2,386,787 | Geertsen | Oct. 16, 1945 |
| 2,399,250 | Peters | Apr. 30, 1946 |
| 2,547,899 | Zinn | Apr. 3, 1951 |
| 2,562,579 | Ringler | July 31, 1951 |